(12) United States Patent
Harumoto et al.

(10) Patent No.: US 8,972,079 B2
(45) Date of Patent: Mar. 3, 2015

(54) CONDITIONAL VEHICLE REMOTE STARTING

(71) Applicant: Fujitsu Ten Limited, Kobe-shi, Hyogo (JP)

(72) Inventors: Satoshi Harumoto, Kobe (JP); Mitsuru Ohta, Kobe (JP); Junko Haruna, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 197 days.

(21) Appl. No.: 13/658,171

(22) Filed: Oct. 23, 2012

(65) Prior Publication Data

US 2013/0151037 A1   Jun. 13, 2013

(30) Foreign Application Priority Data

Dec. 9, 2011   (JP) .................................. 2011-270068

(51) Int. Cl.
*G06F 17/00* (2006.01)

(52) U.S. Cl.
USPC ...... 701/2; 701/1; 701/36; 701/113; 701/117; 701/408; 340/426.36; 340/426.14; 340/428; 340/430; 340/429

(58) Field of Classification Search
CPC ................. B60W 50/0098; B60W 2050/0078; B60W 2550/16
USPC .............................................. 701/2, 565, 517
See application file for complete search history.

(56) References Cited

U.S. PATENT DOCUMENTS

| | | | | |
|---|---|---|---|---|
| 5,818,329 A * | 10/1998 | Allen | ....................... | 340/426.17 |
| 6,363,323 B1 * | 3/2002 | Jones | ........................... | 701/468 |
| 6,633,811 B1 * | 10/2003 | Aumayer | ....................... | 701/409 |
| 6,918,368 B2 * | 7/2005 | Nantz et al. | ................ | 123/179.2 |
| 7,215,254 B2 * | 5/2007 | Tauchi | ............ | 340/903 |
| 8,140,358 B1 * | 3/2012 | Ling et al. | ......................... | 705/4 |
| 8,306,728 B2 * | 11/2012 | Miller et al. | .................. | 701/301 |
| 8,489,085 B2 * | 7/2013 | Simmons | ....................... | 455/420 |
| 2002/0115436 A1 * | 8/2002 | Howell et al. | .................. | 455/426 |
| 2006/0080007 A1 * | 4/2006 | Gerard et al. | ..................... | 701/2 |
| 2006/0082434 A1 * | 4/2006 | Brey | ............................. | 340/5.6 |
| 2006/0274828 A1 * | 12/2006 | Siemens et al. | .......... | 375/240.01 |
| 2006/0274829 A1 * | 12/2006 | Siemens et al. | .......... | 375/240.01 |
| 2008/0228344 A1 * | 9/2008 | Sampson et al. | ................ | 701/33 |
| 2008/0297376 A1 * | 12/2008 | McCall | ......... | 340/989 |
| 2009/0273438 A1 * | 11/2009 | Sultan et al. | ................... | 340/5.7 |
| 2010/0156711 A1 * | 6/2010 | Christensen et al. | ..... | 342/357.07 |
| 2010/0188199 A1 * | 7/2010 | Tanaka et al. | ............. | 340/426.1 |
| 2011/0071701 A1 * | 3/2011 | Holub et al. | ...................... | 701/2 |
| 2012/0172010 A1 * | 7/2012 | Oman et al. | .............. | 455/414.1 |
| 2013/0113637 A1 * | 5/2013 | Sin et al. | ....................... | 340/989 |
| 2014/0074320 A1 * | 3/2014 | Nishida | ............................ | 701/2 |

FOREIGN PATENT DOCUMENTS

JP   A-2006-352460   12/2006

* cited by examiner

*Primary Examiner* — John R Olszewski
*Assistant Examiner* — Truc M Do
(74) *Attorney, Agent, or Firm* — Oliff PLC

(57) ABSTRACT

When vehicle position information at a time of parking start is available, a remote starter transmits the vehicle position information at the time of parking start to an information processor. When the vehicle position information at the time of parking start is unavailable, the remote starter transmits the vehicle position information obtained just before the vehicle position information becomes unavailable, as the vehicle position information at the time of parking start to the information processor.

7 Claims, 22 Drawing Sheets

CONDITIONAL VEHICLE REMOTE STARTING

BACKGROUND OF THE INVENTION

1. Field of the Invention

The invention relates to a technology that implements remote start control on a vehicle by use of a mobile terminal.

2. Description of the Background Art

Conventionally known is a remote starter that controls driving of a driving apparatus such as an engine or a motor of user's vehicle by use of a mobile terminal. By use of this technology, a user can start the driving apparatus of his or her vehicle that is away from the user. Therefore, in an example, the user can turn on an air conditioner to control the temperature of the vehicle cabin to be appropriate before the user gets in his or her vehicle. Known these days is a remote operation system that operates an on-vehicle apparatus of own vehicle via a center by use of a mobile phone as a mobile terminal.

In common case when the user uses the remote starter, the user is far from the vehicle. However, when the user is too far away from the vehicle, it may be impossible for the user to get in the vehicle in a short time. In such a case, starting the driving apparatus by a remote starting function to control the temperature in the vehicle cabin may be useless. To prevent this, appropriateness of starting may be judged based on the calculated distance between the user and the user's vehicle, upon reception of the request for starting.

For calculating the distance between the user and the vehicle, information of the parking position of the vehicle must be obtained. However, there is a case where the parking position cannot be obtained in a case such as where the vehicle whose parking position is to be obtained by GPS is parked at an underground parking area. In such a case, since the distance between the user and the user's vehicle can not be calculated, there is a possibility that appropriateness of the starting cannot be judged.

SUMMARY OF THE INVENTION

According to one aspect of the invention, a remote starter is installed in a vehicle and executes starting control of a driving apparatus of the vehicle. Moreover, the remote starter executes the starting control of the driving apparatus in response to a request for starting transmitted by an information processor that is located outside the vehicle, the request for starting being transmitted based on vehicle position information of the vehicle at a time of parking start prior to the request for starting. The remote starter includes a communicator that communicates with the information processor by transmitting and receiving information, a position-information-obtaining-part that obtains the vehicle position information of the vehicle, and a controller that obtains parking start information of the vehicle, wherein when the position-information-obtaining-part has obtained the vehicle position information at the time that the controller obtains the parking start information, the communicator transmits the vehicle position information at the time of parking start to the information processor, and when the position-information-obtaining-part has not obtained the vehicle position information at the time that the controller obtains the parking start information, the communicator transmits last position information that is the vehicle position information obtained by the position-information-obtaining-part just before the vehicle position information becomes unavailable, to the information processor as the vehicle position information at the time of parking start.

Since the remote starter periodically obtains the vehicle position information for storage, the remote starter stores the obtained latest vehicle position information even if the vehicle position information becomes unavailable. When obtaining the vehicle position information at the time of parking start, the remote starter transmits the obtained vehicle position information to the information processor. Thus, the information processor can obtain information of an accurate parking start position. Even when not having obtained the vehicle position information at the time of parking start, the remote starter transmits the last position information that is the vehicle position information obtained by the position-information-obtaining-part just before the vehicle position information becomes unavailable as the vehicle position information at the time of parking start to the information processor. Thus, the information processor can obtain information of a rough parking start position.

According to another aspect of the invention, the communicator transmits the last position information also when the position-information-obtaining-part judges that the vehicle position information is not available.

The remote starter transmits the last position information also when the position-information-obtaining-part judges that the vehicle position information is not available. Therefore, the information processor is capable of obtaining the information of the rough parking start position even when the remote starter can not communicate with the information processor at the time of parking start.

Therefore, the object of the invention is to provide a technology relevant to remote starting vehicle control that is capable of obtaining substitute vehicle position information of a vehicle that is in the situation where the vehicle position information is not available, while saving communication time and reducing communication costs.

These and other objects, features, aspects and advantages of the present invention will become more apparent from the following detailed description of the present invention when taken in conjunction with the accompanying drawings.

DESCRIPTION OF THE EMBODIMENTS

Hereinafter, some embodiments of the invention are described with reference to attached drawings.

<1. First Embodiment>
<1-1. Outline of System>

Figure 1:
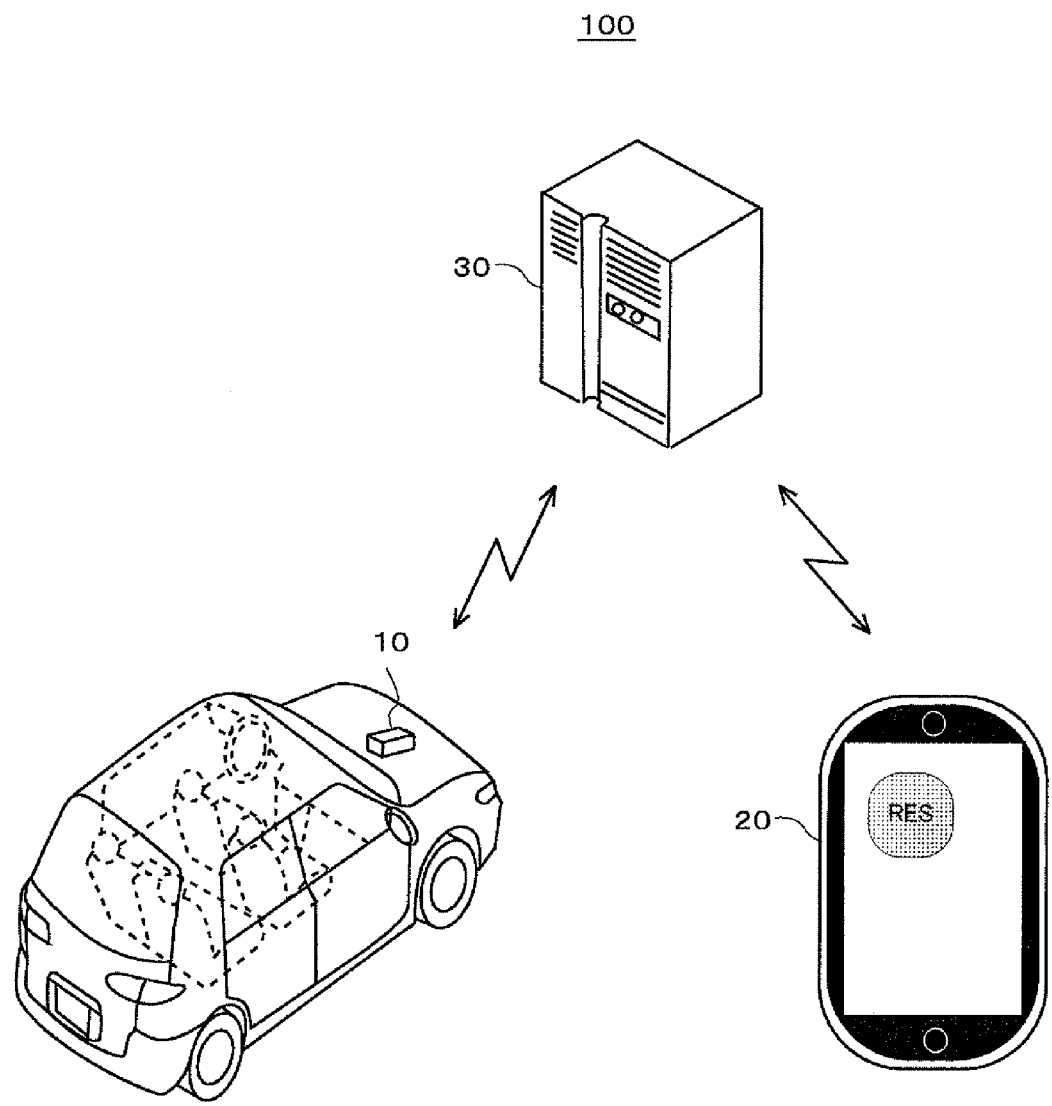
FIG. 1 shows a schematic vehicle control system.

FIG. 1 shows an outline of a remote starter system 100 of the first embodiment. The remote starter system 100 includes a remote starter 10, a mobile terminal 20 and a center 30.

The remote starter 10 is installed in a vehicle to control the vehicle in accordance with the control information transmitted by the center 30. The remote starter 10 is communicatively connected to the center 30, transmits to the center 30 vehicle information including position information at a predetermined timing, and receives via the center 30 from the mobile terminal 20 the control information including a request for starting. Upon receiving the request for starting from the center 30, the remote starter 10 implements controls for starting of a driving apparatus and various apparatuses on the vehicle.

The driving apparatus is an engine or a motor. The invention is adaptable to both cases. However, for convenience sake, the embodiment may be described by use of the engine. The various apparatuses are, for example, an air conditioner and a door. That is, the remote start control controls start/stop of the engine or the motor, on/off operation of the air conditioner, open/close of the door, and the like. In the description below, the target to be remote-started may be indicated simply as a "driving apparatus," and the action such as start/stop or on/off operation may be indicated simply as "starting."

The mobile terminal 20 is a mobile electronic device that a user carries, for example, a smartphone, a tablet PC, a mobile phone or a PDA (Personal Digital Assistant). The mobile terminal 20 stores an application for remotely starting the driving apparatus on the vehicle. The user can remotely send the request for starting or make various settings by executing an operation of the application stored in the mobile terminal 20. The mobile terminal 20 is configured to be communicatively coupled to the center 30, and transmits to the center 30 the request for starting, information on various settings and position information of the mobile terminal 20.

The center 30 is an information processor that totally controls the remote starter system 100. The center 30 is configured to be communicatively coupled to the remote starter 10 and to the mobile terminal 20, and controls start of the driving apparatus by transmitting and receiving the request for starting and the vehicle information mutually. In a concrete example, the center 30 receives from the vehicle the vehicle information including the position information, and receives from the mobile terminal 20 the request for starting and the position information. Upon receiving the request for starting from the mobile terminal, the center 30 makes a control, such as judgment or direction on whether to implement remote starting, based on the position information of the mobile terminal 20 and the position information of the vehicle.

As above, the remote starter system 100 of the embodiment is capable of vehicle remote start control that prevents unnecessary starting while reducing communication costs and saving communication time by causing the center 30 to control starting of the driving apparatus based on the position information of the vehicle and the position information of the mobile terminal obtained at a predetermined timing. Hereinafter described are the configuration and the processing on the remote starter system 100.

<1-2. Configuration of Remote Starter>

Figure 2:
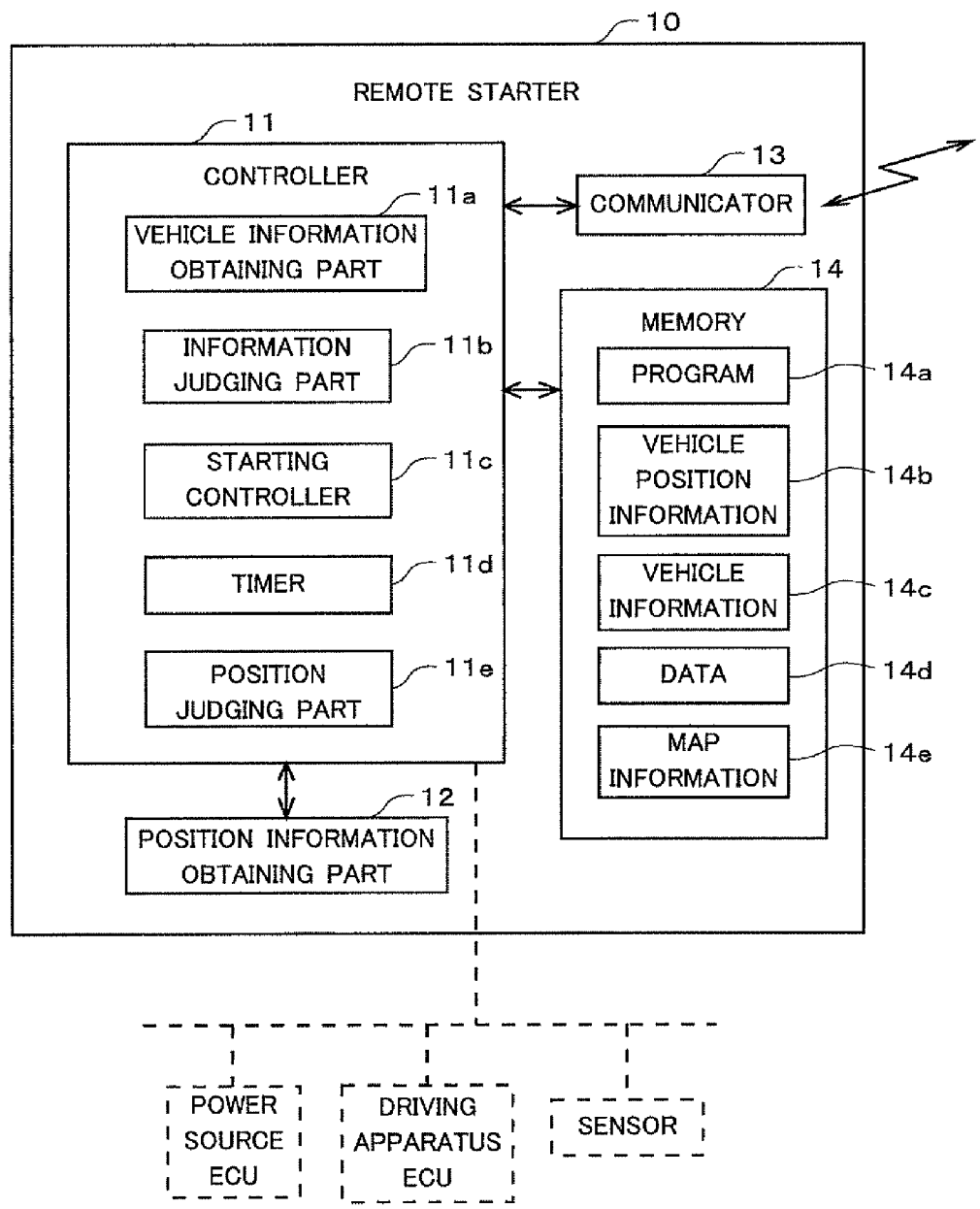
FIG. 2 shows a schematic block diagram of a remote starter of the first embodiment.

First, the configuration of the remote starter 10 is described. FIG. 2 shows a schematic block diagram of the remote starter 10. As shown in FIG. 2, the remote starter 10 includes a controller 11, a position information obtaining part 12, a communicator 13 and memory 14.

The controller 11 that includes a vehicle information obtaining part 11a, an information judging part 11b, a starting controller 11c, a timer 11d and a position judging part 11e, is a computer that has a CPU, RAM and ROM not shown in FIG. 2. The controller 11 that is connected to the communicator 13 and the memory 14 that are included in the remote starter 10, controls whole of the remote starter 10 by transmitting and receiving information based on a program 14a stored in the memory 14. Arithmetic processing by the CPU based on the program stored in the memory 14 performs the functions of the controller 11, such as the information judging part 11b and the starting controller 11c.

The controller 11 is communicatively connected to other various sensors and ECUs (Electronic Control Units) on the vehicle via an on-vehicle LAN (Local Area Network) such as a CAN (Controller Area Network) for transmitting and receiving various types of information. Since the controller 11 controls the overall processing of the remote starter 10, the controller 11 also includes the processing other than the processing executed by the vehicle information obtaining part 11a, the information judging part 11b, the starting controller 11c and the timer 11d described above.

The vehicle information obtaining part 11a obtains the vehicle information as the information indicating driving conditions or the conditions of other ECUs. The vehicle is equipped with various sensors that detect the vehicle driving conditions, such as a vehicle velocity sensor and a steering angle sensor. The vehicle is also equipped with an engine-control-type ECU such as a fuel injection ECU, and a body-control-type ECU such as a door lock/unlock ECU. The vehicle information obtaining part 11a obtains, as the vehicle information, output from the sensors and the ECUs via the CAN.

The information judging part 11b judges the contents of the vehicle information obtained from other sensors and ECUs in the vehicle, and judges the contents of the information received from the center 30. Besides the information described above, the vehicle information includes the information on an ignition being switched on or off. The information received from the center 30 also includes a command relevant to the request for starting the driving apparatus.

The starting controller 11c controls the starting or the stopping of the driving apparatus and various apparatuses that are installed in the vehicle. That is, the starting controller 11c transmits an applicable direction to the ECU to be controlled upon receiving the command of the request for starting from the center 30. In an example, when receiving from the center 30 the command of the request for starting the driving apparatus, the starting controller 11c transmits via the CAN the direction for starting to the ECU that controls the driving of the driving apparatus. When receiving the command of the request for starting the air conditioner, the starting controller 11c transmits via the CAN the direction for starting to the ECU that controls the driving of the air conditioner.

The timer 11d counts elapsed time. In an example, when a period of time for driving the driving apparatus executed by the remote starter is determined in advance, the timer 11d counts the elapsed time from the starting, and judges whether the predetermined period of time has elapsed. The timer 11d is also capable of measuring clock time, for example, recording the clock time at the time of starting.

Upon the vehicle information obtaining part 11a obtaining the information of the ignition being switched off (that is, parking start information), the position judging part 11e judges whether the vehicle is parked in a restricted area. The restricted area includes a no-idling zone and a specific area. In the no-idling zone, no vehicle is allowed to be kept in the idling condition. In the specific area, it is rear that the remote starter causes the vehicle to idle. That is, the specific area includes the place in which a user almost always comes back to the vehicle in a short time after getting out, such as a rest area and a parking area on an expressway, and a parking area of a convenience store. The information on these areas is included in the map information 14e stored in the memory 14.

The position judging part 11e judges whether the vehicle is parked in the no-idling zone, by comparing the map information 14e and the parking start position of the vehicle. When judging that the vehicle is parked in the no-idling zone, the position judging part 11e does not execute the processing for transmitting vehicle position information.

The position judging part 11e identifies where the specific areas are located based on road information and facility information included in the map information 14e stored in the memory 14, and judges whether the vehicle is parked in the specific area based on the vehicle position information. The user may set the specific areas on the map information 14e in advance. The position judging part 11e judges whether the vehicle is parked in the specific area, by comparing the specific area and the parking start position of the vehicle. When judging that the vehicle is parked in the specific area, the position judging part 11e forbids the processing for transmitting the vehicle position information. When judging that the vehicle is not parked in the specific area, the position judging part 11e executes the processing for transmitting the vehicle position information.

The user may change the setting regarding whether to forbid or permit the processing for transmitting the vehicle position information when the vehicle is parked in the no-idling zone or in the specific area. Here is an example case where a restriction mode is provided to restrict the processing for transmitting the vehicle position information. In the case where the user activates the restriction mode, transmitting the vehicle position information is forbidden when the vehicle is parked in the restricted area. In the case where the user deactivates the restriction mode, transmitting the vehicle position information is executed wherever the vehicle is parked. The user can activate or deactivate the restriction mode by the mobile terminal 20 via the center 30.

The position information obtaining part 12 obtains the position information indicating the current position of the remote starter 10. GPS (Global Positioning System), for example, may be used as the position information obtaining part 12. The position information includes latitude information and longitude information. That is, the position information obtaining part 12 obtains the latitude information and the longitude information of the current position by use of the GPS.

In some environments where the remote starter 10 is installed, the position information using the GPS is not available. In this case, the position information obtaining part 12 judges that the position information is not available, and obtains the information indicating that the position information is undetermined (hereinafter, referred to as "undetermined-information") as the information indicating that the position information is not available.

The position information also indicates the position of the vehicle because the obtained position information indicates the position of the remote starter 10 that is installed in the vehicle. Therefore, the position information obtained by the position information obtaining part 12 is referred to as "vehicle position information," hereafter. That is, the vehicle position information includes the position information including the latitude information and the longitude information obtained by the GPS, and the undetermined-information when the position information using the GPS is not available. The vehicle position information 14b is stored in the memory 14.

The communicator 13 is communicatively connected to the center 30 for transmitting information to and receiving information from the center 30. In an example, the communicator 13 transmits the vehicle position information or the vehicle information to the center 30, and receives from the center 30 a command such as a request for communication connection or the request for starting, that is, the control information. Communications between the remote starter 10 and the center 30 are through a so-called mobile telephone network. Therefore, the communicator 13 also judges whether the communicator 13 is located in a "service area" where communications with the center are available, or in an "out-of-service area" where communications are not available. Data 14d such as the command transmitted by the center 30 are stored in the memory 14.

The memory 14 stores the program 14a, the vehicle position information 14b, vehicle information 14c, the data 14d and the map information 14e. The memory 14 of the embodiment is nonvolatile semiconductor memory that is capable of reading and writing data electrically, and of keeping data even in power-off state. For example, EEPROM (Electrical Erasable Programmable Read-Only Memory) or flash memory may be used as the memory 14. However, other memory medium or a hard disk drive including a magnetic disk may be used. The program is so-called system software that the controller 11 reads out to execute for controlling the remote starter 10. The map information 14e includes road information and facility information around the country or in a predetermined wide area.

The vehicle position information 14b includes a plurality of vehicle position information that have been periodically obtained by the position information obtaining part 12 along with a plurality of time information, or includes the rewritten vehicle position information apart from the undetermined-information. That is, the memory 14 certainly stores the lastly-obtained vehicle position information. In other words, even when the vehicle position information becomes unavailable while running, the lastly-obtained vehicle position information is stored.

In the embodiment, the memory 14 of the remote starter 10 stores the map information 14e, and the position judging part 11e judges whether the vehicle is parked in the restricted area, which is not limited to this. In an example case where the vehicle is equipped with a navigation apparatus, the map information stored in memory of the navigation apparatus may include the information of the restricted area. In the configuration of this case, the position judging part 11e obtains the information of the restricted area from the navigation apparatus, and judges whether the vehicle is parked in the restricted area.

In the embodiment, the specific area is specified by the remote starter 10. However, in another configuration, the specific area may be specified by the center 30, and the specified specific area information may be transmitted to the remote starter 10.

<1-3. Configuration of Mobile Terminal>

Figure 3:
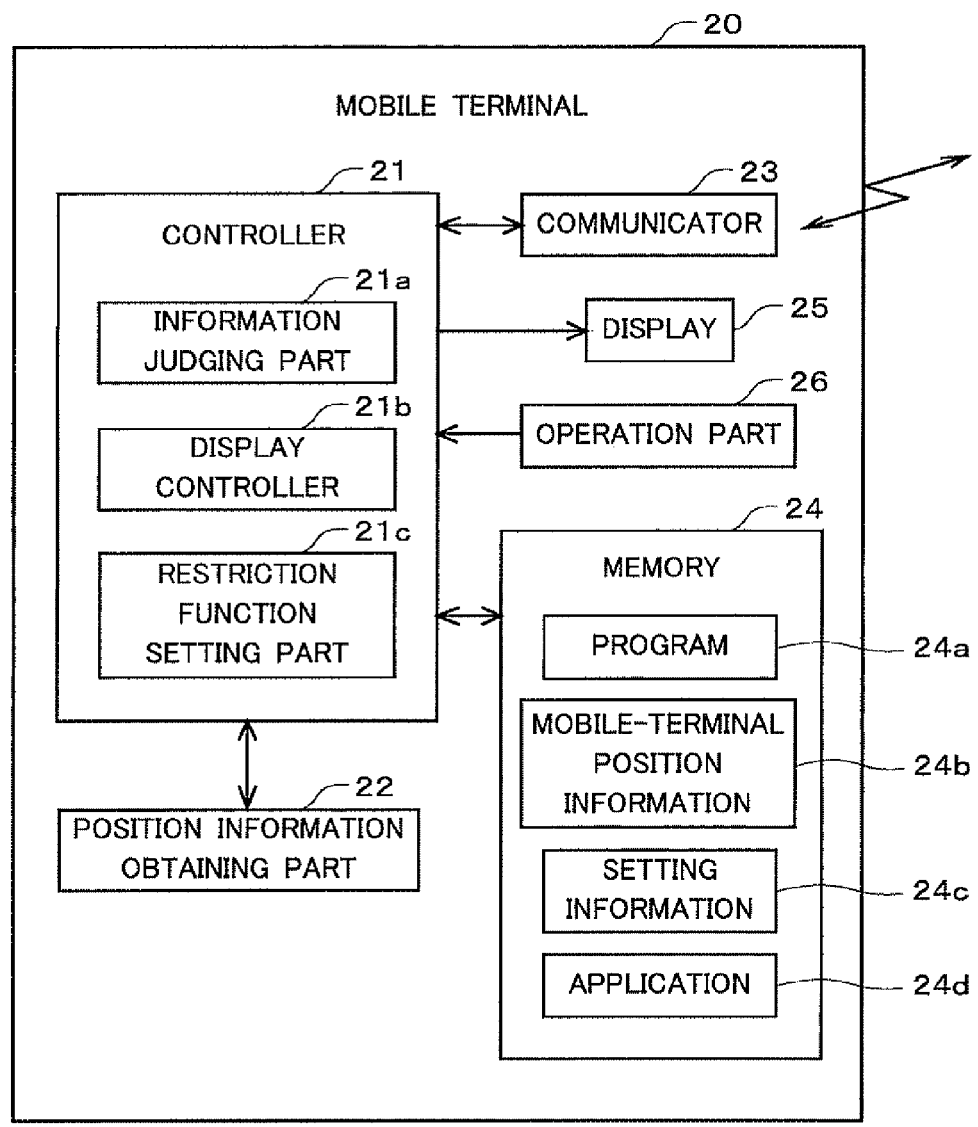
FIG. 3 shows a schematic block diagram of a mobile terminal.

Described next is the configuration of the mobile terminal 20. FIG. 3 shows a schematic block diagram of the mobile terminal 20. As shown in FIG. 3, the mobile terminal 20 includes a controller 21, a position information obtaining part 22, a communicator 23, memory 24, a display 25 and an operation part 26.

The controller 21 that includes an information judging part 21a, a display controller 21b and a restriction function setting part 21c, is a computer that has a CPU, RAM and ROM not shown in FIG. 3. The controller 21 that is connected to the communicator 23, the memory 24, and others that are included in the mobile terminal 20, transmits and receives information based on a program 24a stored in the memory 24, and controls whole of the mobile terminal 20. Arithmetic processing by the CPU based on the program stored in the memory 24 performs the functions of the controller 21 such as the information judging part 21a and the display controller 21b. Since the controller 21 controls the overall processing of the mobile terminal 20, the controller 21 also controls the processing other than the processing executed by the information judging part 21a, the display controller 21b and the restriction function setting part 21c, including execution of the function of the application relevant to the remote starting.

The information judging part 21a judges the contents of the obtained information. In an example, the information judging part 21a judges the contents of the information received from the center 30, and judges the contents of the commands entered via the operation part 26 of the mobile terminal 20. The information received from the center 30 includes, for example, an inquiry relevant to the vehicle information and an inquiry on whether to implement the starting. The command entered via the operation part 26 of the mobile terminal 20 includes, for example, the command of the request for starting or stopping the driving apparatus.

The display controller 21b makes control so as to display an image on the display 25 of the mobile terminal 20. Concretely, the display controller 21b makes control to display on the display 25 an operation screen for receiving direction for starting the driving apparatus, and a check screen received from the center 30.

The restriction function setting part 21c activates or deactivates the function that restricts the remote starting processing of the driving apparatus of the vehicle (hereinafter, referred to as "restriction function") when predetermined conditions are met. The predetermined conditions are the conditions that determine whether to execute the remote starting function of the driving apparatus of the vehicle (hereinafter, referred to as "restriction conditions"). The restriction function setting part 21c has a function to change the restriction conditions as well. One of the restriction conditions may relate to the distance between the mobile terminal position at the time of the request for starting and the vehicle position at the time of parking start. The restriction function based on this restriction condition is indicated as "distance-restriction function." Another one of the restriction conditions may relate to the difference between the vehicle positions at the time of parking start and at the time of the request for starting. The restriction function based on this restriction condition is referred to as "position-restriction function." Further, another one of the restriction conditions may relate to whether the door of the vehicle is locked, or whether a gear is set at a parking position.

The information indicating the restriction function activated or deactivated and the restriction conditions (hereinafter, referred to as "setting information" collectively) are stored in the memory 24. When the user selects a setting mode by operating the mobile terminal, setting information 24c is read out from the memory 24 and displayed on the display 25. The user can make new setting information in terms of the displayed setting information by activating or deactivating the restriction function, or by changing the conditions in accordance with a change screen. The new setting information is transmitted to the center 30 as well as being stored in the memory 24. The setting information 24c may not be stored in the memory 24 of the mobile terminal 20, but be stored only in the memory 33 of the center 30. In this case, the restriction function setting part 21c reads out the setting information from the memory 33 of the center 30.

The position information obtaining part 22 obtains the position information indicating the current position of the mobile terminal 20 (hereinafter, referred to as "mobile-terminal position information"). For example, the GPS may be used as the position information obtaining part 22. The mobile-terminal position information includes latitude information and longitude information. That is, the position information obtaining part 22 obtains the latitude information and the longitude information of the current position by use of the GPS. The obtained mobile-terminal position information 24b is stored in the memory 24.

The communicator 23 is communicatively connected to the center 30 for transmitting information to and receiving information to the center 30. In an example, the communicator 23 transmits to the center 30 the command of the request for starting or the mobile-terminal position information, and receives from the center 30 the command of the request for communication connection or an inquiry on whether to implement the starting. Communication between the mobile terminal 20 and the center 30 is through the so-called mobile telephone network. Therefore, the communicator 23 also judges whether the communicator 23 is located in the "service area" where communication with the center 30 is available, or in the "out-of-service area" where communications are not available.

The memory 24 stores a program 24a, the mobile-terminal position information 24b, the setting information 24c and an application 24d. The memory 24 of the embodiment is non-volatile semiconductor memory that is capable of reading and writing data electrically, and of keeping data even in power-off state. For example, EEPROM or flash memory may be used as the memory 24. However, other memory medium or a hard disk drive including a magnetic disk may be used. The program 24a is so-called system software that the controller 21 reads out to execute for controlling the mobile terminal 20. The application 24d is a control program for the remote starting function.

The display 25 displays the operation screen of the application for controlling the remote starting function, and the check screen on which the user checks the vehicle information transmitted by the center 30. For example, a liquid crystal display and an organic EL display are used as the display 25.

The operation part 26 is an information input apparatus including a mechanical button and a touch panel. The user can make various operations relevant to the control of the remote starting function, and set or change the setting information, by operating the operation part 26. The operation part 26 may be configured as a unit of the display 25.

<1-4. Configuration of Center>

Figure 4:
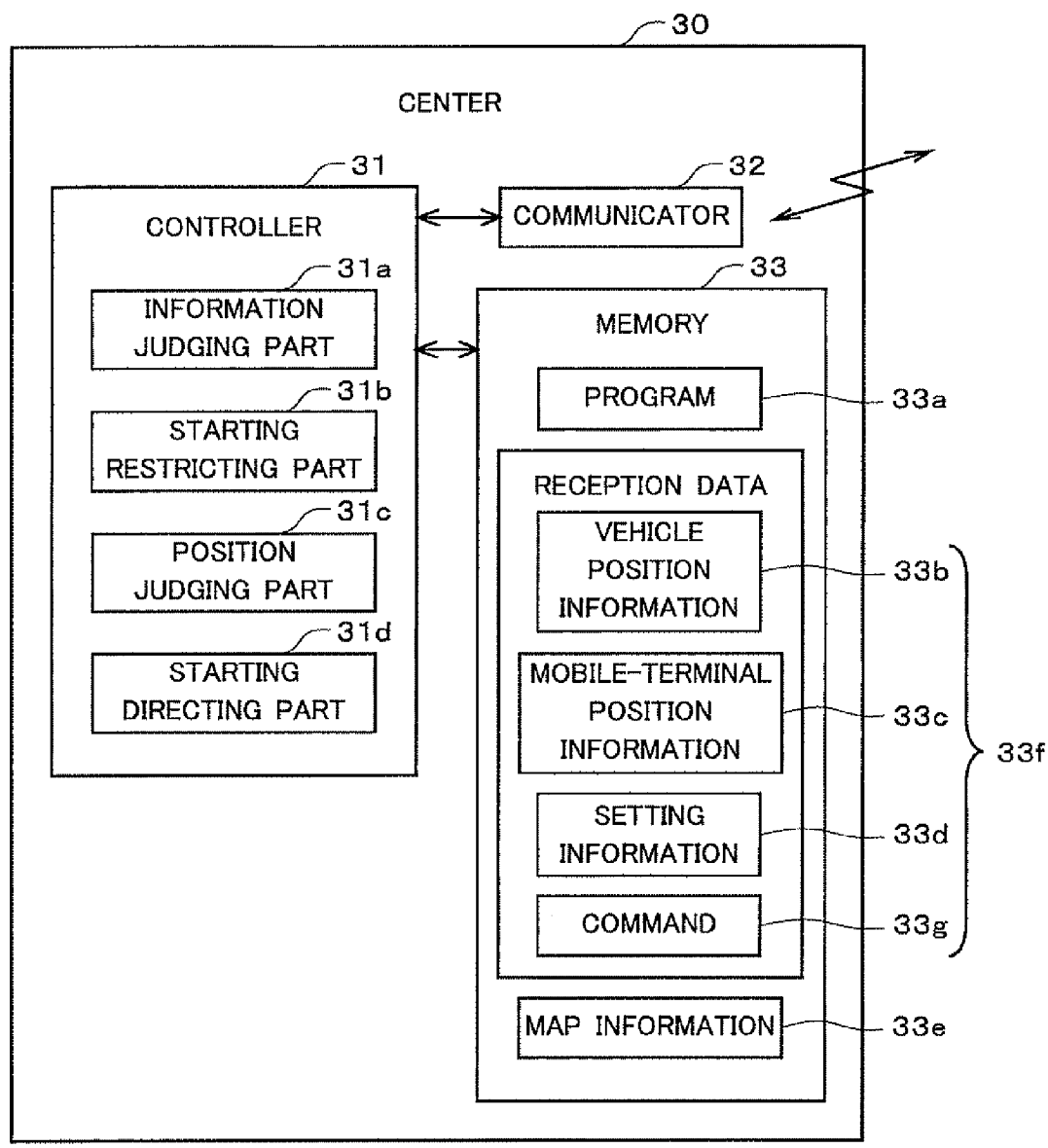
FIG. 4 shows a schematic block diagram of a center.

Next, the configuration of the center 30 is described. FIG. 4 shows a schematic block diagram of the center 30. As shown in FIG. 4, the center 30 includes a controller 31, a communicator 32 and memory 33.

The controller 31 that includes an information judging part 31a, a starting restricting part 31b, a position judging part 31c and a starting directing part 31d, is a computer that has a CPU, RAM and ROM not shown in FIG. 4. The controller 31 that is connected to the communicator 32, the memory 33 and others that are included in the center 30, transmits and receives information based on a program stored in the memory 33, and controls whole of the center 30. Arithmetic processing by the CPU based on the program 33a stored in the memory 33 performs the functions of the controller 31, such as the information judging part 31a and the starting restricting part 31b. The controller 31 controls the overall processing to be executed by the center 30, which includes the processing other than the one done by the information judging part 31a, the starting restricting part 31b, the position judging part 31c and the starting directing part 31d, as well.

The information judging part 31a judges the contents of the information or the command received from the remote starter 10 or the mobile terminal 20. Concretely, the information judging part 31a judges whether the information received from the remote starter 10 is the vehicle position information, the information indicating starting of the driving apparatus, or the information on the ignition being switched on or off. The information judging part 31a also judges whether the information received from the mobile terminal 20 is the mobile-terminal position information, the command of the request for starting or stopping the driving apparatus, or the change information of the setting information.

Upon reception of the command of the request for starting from the mobile terminal 20, the starting restricting part 31b judges whether to restrict the starting of the driving apparatus based on the setting information. Concretely, upon the judgment that the command of the request for starting has been received from the mobile terminal 20, the starting restricting part 31b judges whether to start the driving apparatus based on the vehicle position information, the mobile-terminal position information and the setting information.

Here is an example of the case where the distance-restriction function is activated, and the restriction conditions are set based on the distance between the parking start position of the vehicle and the position of the mobile terminal at the time of the request for starting. The starting restricting part 31b obtains the distance between the vehicle position at the time of parking start and the position of the mobile terminal at the time of the request for starting based on the vehicle position information and the mobile-terminal position information, and judges whether to restrict the starting of the driving apparatus by comparing the obtained distance and the restriction conditions.

More concretely, the starting restricting part 31b calculates the distance between the vehicle and the mobile terminal 20 by comparing vehicle position information 33b at the time of the ignition being switched off read out from the memory 33 (that is, the vehicle position information at the time of parking start) and mobile-terminal position information 33c received from the mobile terminal 20 (that is, the mobile-terminal position information at the time of the request for starting). Then, the starting restricting part 31b reads out from the memory 33 a restriction distance included in setting information 33d, and judges whether the calculated distance is equal to or longer than the restriction distance. The restriction distance is one of the restriction conditions, in terms of the distance for restricting the starting.

The starting restricting part 31b continues the processing for starting the driving apparatus when the calculated distance is shorter than the restriction distance, and restricts the processing for starting when the calculated distance is equal to or longer than the restriction distance. The restriction of the processing for starting includes forbiddance of the processing for starting. That is, the processing for restricting the processing for starting is, for example, to cancel the processing for starting when forbidding the processing for starting, and to confirm with the user whether to continue the processing for starting when restricting the processing for starting.

Here is another example of the case where the position-restriction function is activated, and the restriction conditions are set based on the difference between the vehicle positions at the time of parking start and at the time of the request for starting. The starting restricting part 31b judges whether to restrict the starting of the driving apparatus based on the vehicle position information at the time of parking start and the vehicle position information at the time of the request for starting.

Concretely, the starting restricting part 31b judges the difference between the vehicle position information 33b at the time of the ignition being switched off read out from the memory 33 (that is, the vehicle position information at the time of parking start) and the vehicle position information 33b obtained from the remote starter 10 when the command of the request for starting is received from the mobile terminal 20 (that is, the vehicle position information at the time of the request for starting), by comparing them with each other. Then, the starting restricting part 31b reads out from the memory 33 the restriction conditions included in the setting information 33d, and compares the read-out restriction conditions and the result of the judged difference. One of the restriction conditions restricts the starting when the two of the vehicle position information are different.

Under this condition, upon the judgment that the two of the vehicle position information are different, the starting restricting part 31b restricts the processing for starting. That is, the judgment that the two of the vehicle position information are different indicates that the vehicle has moved from the position at the time of the parking start to the position at the time of the request for starting. The assumed factor of the vehicle having moved is that the vehicle has been stolen or towed away. Therefore, when the two of the vehicle position information are different, the starting restricting part 31b forbids the starting or restricts the starting such as by confirming with the user whether to continue the processing for starting.

Upon reception of the command of the request for starting from the mobile terminal 20, the position judging part 31c judges whether the vehicle is parked in the no-idling zone. The no-idling zone is, as described above, the zone in which no vehicle is allowed to be kept in the idling condition. The information of plural no-idling zones is included in map information 33e stored in the memory 33. The position judging part 31c judges whether the vehicle is parked in the no-idling zone by comparing the map information 33e and the parking start position of the vehicle read out from the memory 33. Upon the judgment that the vehicle is parked in the no-idling zone, the position judging part 31c does not execute the processing for starting.

If it is forbidden that the remote starter 10 transmits to the center 30 the parking position information when the vehicle is parked in the no-idling zone, this processing is not needed originally. However, since the user can change the setting of transmission processing forbidden or permitted in the embodiment, this processing is needed.

The position judging part 31c judges whether the vehicle is parked in the specific area, as well. The specific area is, as described above, the area in which the remote starting function rarely allows the vehicle to idle, and in which the user almost always comes back in a short time to the vehicle after getting out of the vehicle.

The position judging part 31c identifies where the specific areas are located based on the road information and the facility information of the map information 33e stored in the memory 33, and judges whether the vehicle is parked in the specific area based on the vehicle position information. The user may set the specific areas in the map information 33e in advance. The position judging part 31c judges whether the vehicle is parked in the specific area by comparing the specific area and the parking start position of vehicle read out from the memory 33. The position judging part 31c restricts the processing for starting when judging that the vehicle is parked in the specific area, and continues the processing for starting when judging that the vehicle is not parked in the specific area.

If it is forbidden that the remote starter 10 transmits the parking position information to the center 30 when the vehicle is parked in the specific area, this processing is not needed originally. However, since the user can change the setting of transmission processing forbidden or permitted in the embodiment, this processing is needed.

The starting directing part 31d makes the final decision on whether to execute the remote starting function based on the judgment results of the starting restricting part 31b and the position judging part 31c, and executes the processing for transmitting the command of the request for starting to the remote starter 10. Concretely, upon the reception of the command of the request for starting from the mobile terminal 20, both of the starting restricting part 31b and the position judging part 31c judge whether to continue the processing for starting. When both of them judge that the processing for starting is to be continued, the starting directing part 31d makes the final decision to execute the remote starting, and transmits the command of the request for starting to the remote starter 10.

The communicator 32 is configured to be communicatively coupled to the remote starter 10 and the mobile terminal 20 by transmitting and receiving information respectively. In an example, the communicator 32 transmits to the remote starter 10 the command of the request for starting, and to the mobile terminal 20 the information for confirming whether to continue the processing for starting. In another example, the communicator 32 receives from the remote starter 10 the vehicle position information and the vehicle information, and from the mobile terminal 20 the mobile-terminal position information and the command of the request for starting. Communication between the remote starter 10 and the mobile terminal 20 is through the so-called mobile telephone network.

The memory 33 stores the program 33a, the vehicle position information 33b, the mobile-terminal position information 33c, the setting information 33d, the map information 33e and a command 33g. In description, reception data 33f may be used for collective indication of the vehicle position information 33b, the mobile-terminal position information 33c, the setting information 33d and the command 33g. In an adaptable configuration, the command 33g may be stored in the memory 33 so as to be read out when needed for execution, or may not be stored in the memory 33 and be executed upon reception.

The memory 33 of the embodiment is nonvolatile semiconductor memory that is capable of reading and writing data electrically, and of keeping data even in power-off state. For example, EEPROM or flash memory may be used as the memory 33. However, other memory medium or a hard disk drive including a magnetic disk may be used. The program 33a is so-called system software that the controller 31 reads out to execute for controlling the center 30. The map information 33e includes the road information and the facility information around the country or in a predetermined wide area.

<1-5. Processing on Remote Starter>

Described next is the processing on the remote starter 10. Each of FIG. 5, FIG. 6, FIG. 7, FIG. 8 and FIG. 9 shows a flowchart of the processing on the remote starter 10.

Figure 5:
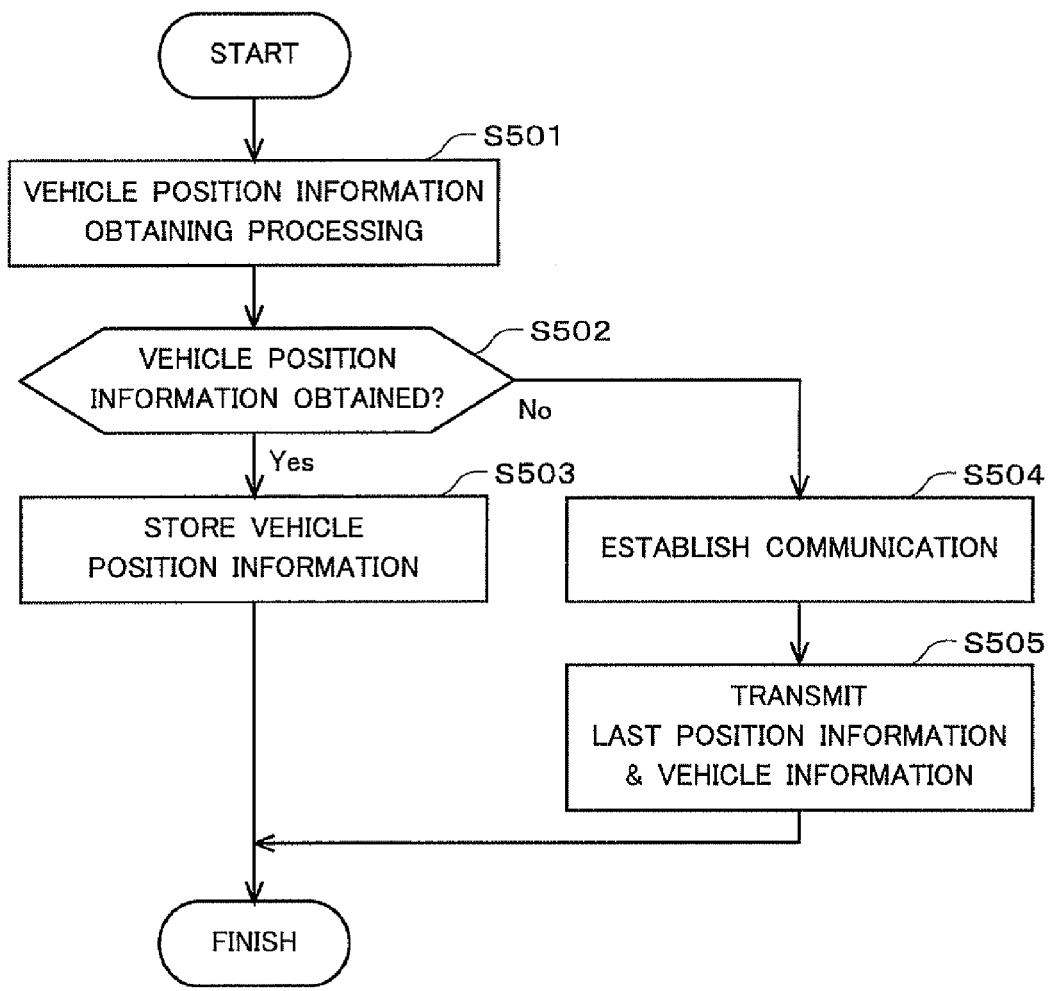
FIG. 5 shows a flowchart of processing on the remote starter.

The remote starter 10 obtains the vehicle position information periodically while the ignition of the vehicle is in the on-state. Here, described is the processing on the remote starter 10 for obtaining the vehicle position information. FIG. 5 shows the flowchart of the processing on the remote starter 10 for obtaining the vehicle position information.

First, the position information obtaining part 12 executes the processing for obtaining the vehicle position information, for example, every 50 ms or 100 ms (step S501). After executing the processing for obtaining the vehicle position information, the position information obtaining part 12 judges whether the vehicle position information has been obtained (step S502). The vehicle position information includes the latitude information and the longitude information. Thus, in an example, when the position information obtaining part 12 has succeeded in appropriately obtaining the latitude information and the longitude information, it is judged that the vehicle position information has been obtained. When the position information obtaining part 12 has not succeeded in obtaining them appropriately, it is judged that the vehicle position information has not been obtained.

When it is judged that the position information obtaining part 12 has succeeded in obtaining the vehicle position information (Yes at the step S502), the position information obtaining part 12 stores the obtained vehicle position information in the memory 14 (step S503), and the procedure of the processing is finished. The procedure of the processing restarts from the step S501 at the next time for obtaining the vehicle position information.

When it is judged that the position information obtaining part 12 has not succeeded in obtaining the vehicle position information (No at the step S502), the controller 11 executes the processing for transmitting to the center 30 the vehicle position information obtained just before the vehicle position information has become unavailable (hereinafter, referred to as "last position information"). Concretely, first of all, the controller 11 establishes communication with the center 30 (step S504). That is, the controller 11 transmits the command of the request for communication connection to the center 30 via the communicator 13. When receiving the command of the request for communication connection, the center 30, if available, permits the communication connection to establish the communication. At the step S502, it is preferable to judge that the position information obtaining part 12 has not succeeded in obtaining the vehicle position information when the position information obtaining part 12 has not succeeded multiple times in obtaining the vehicle position information for a predetermined period.

After the communication is established, the controller 11 reads out the last position information from the memory 14, and transmits the read-out last position information to the center 30 via the communicator 13 (step S505). The position information obtaining part 12 periodically obtains the vehicle position information, and the memory 14 stores the obtained vehicle position information. That is, even after the position information obtaining part 12 has become unable to obtain the vehicle position information, the memory 14 constitutionally stores the obtained vehicle position information including the last position information. As described before, the last position information is the vehicle position information that the position information obtaining part 12 had obtained just before the vehicle position information has become unavailable, in other words, the vehicle position information that has been obtained just before the position information obtaining part 12 has not succeeded in obtaining the vehicle position information, and the vehicle position information just before becoming unavailable.

Moreover, the vehicle information is transmitted as well at the time. The vehicle information of this case includes, for example, the information indicating that the vehicle is running or the information indicating that the transmitted vehicle position information is the last position information. Further, the position information obtaining part 12 may obtain the undetermined-information when the vehicle position information is unavailable, and store the obtained undetermined-information in the memory 14. In this case, it is preferable that the undetermined-information be stored separately from the obtained latest vehicle position information.

As above, the last position information is transmitted to the center 30 when it is judged that the position information obtaining part 12 has not succeeded in obtaining the vehicle position information while running (just after the vehicle position information has not been obtained). This allows the center 30 to understand a rough parking position of the vehicle even when the vehicle position information at the time when parking has started can not be transmitted because the mobile telephone network is not available, as described later. The remote starter 10 repeats the same processing on a regular basis for obtaining the vehicle position information afterward.

Figure 6:
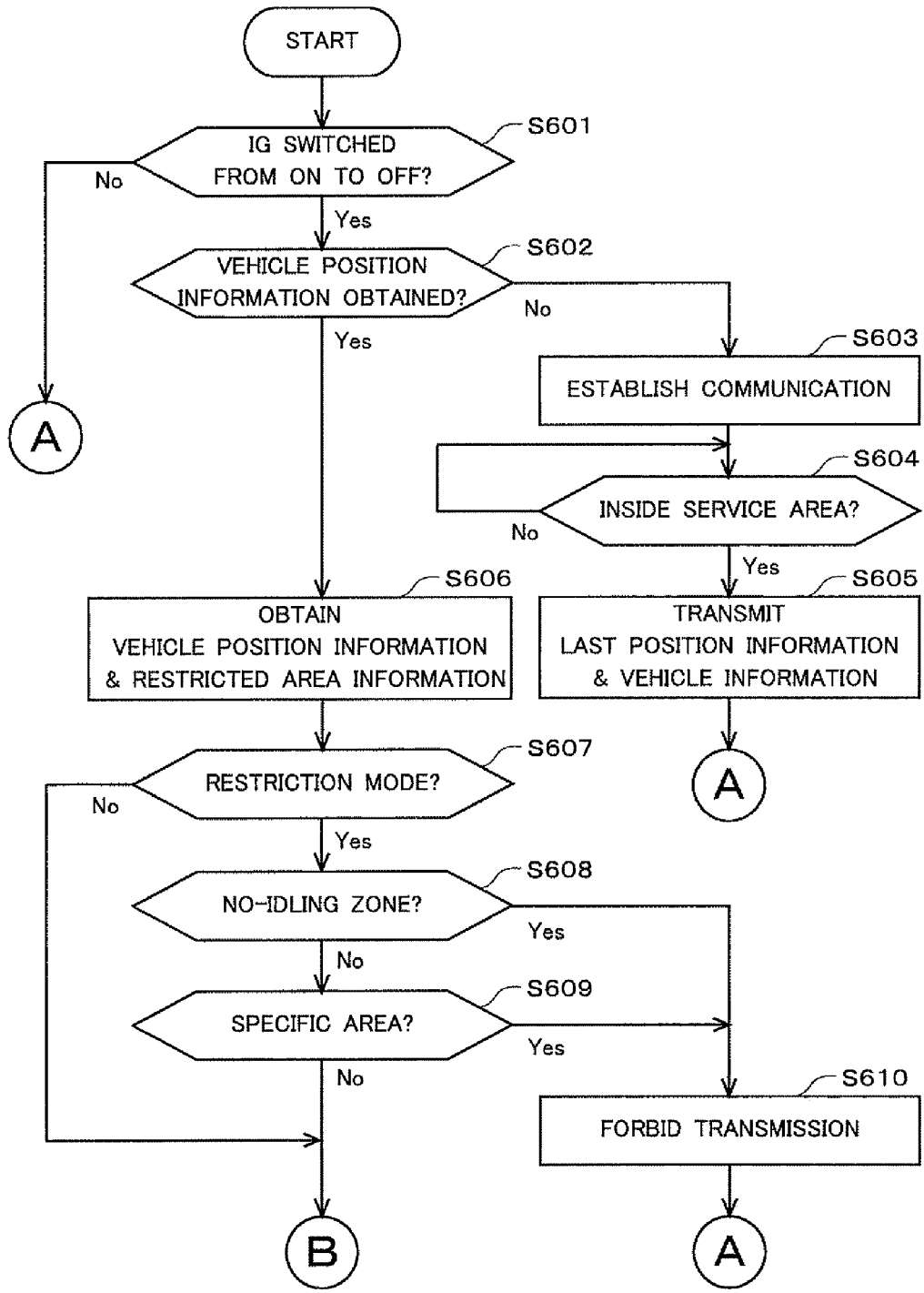
FIG. 6 shows a flowchart of processing on the remote starter of the first embodiment.
Figure 7:
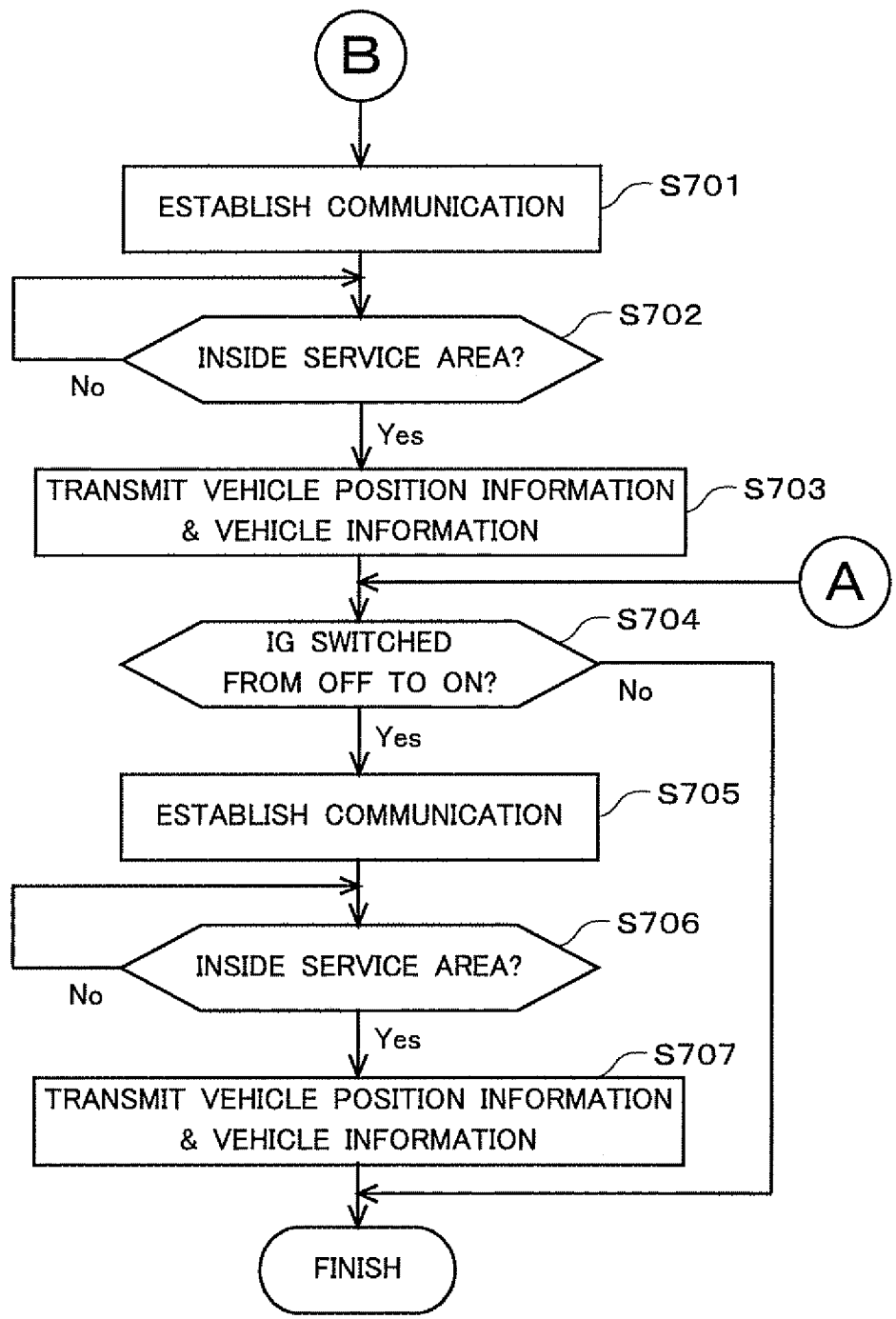
FIG. 7 shows another flowchart of processing on the remote starter of the first embodiment.

When ignition is manually switched on or off, the remote starter 10 executes the processing for transmitting the vehicle position information and the vehicle information to the center 30 in the case where the vehicle is parked outside the restricted area. Described next is the processing on the remote starter 10 for transmitting the vehicle position information and the vehicle information. Each of FIG. 6 and FIG. 7 shows the flowchart of the processing on the remote starter 10 for transmitting the vehicle position information and the vehicle information to the center 30. In the figures, the ignition is indicated as "IG."

First, the vehicle information obtaining part 11*a* detects whether the ignition condition has been manually switched from the on-state to the off state (step S601). Concretely, while the ignition is in the on-state, upon reception via CAN from a power source ECU, of the signal indicating that the ignition is in the off-state, the vehicle information obtaining part 11*a* detects that the ignition condition has been switched from the on-state to the off-state.

When the vehicle information obtaining part 11*a* does not detect that the ignition condition has been switched from the on-state to the off-state (No at the step S601), the procedure moves to the step described later, for detecting whether the ignition condition has been switched from the off-state to the on-state (A in FIG. 6).

When the vehicle information obtaining part 11*a* detects that the ignition condition has been switched from the on-state to the off-state (Yes at the step S601), it is judged that the vehicle is now to be parked. Then, the position information obtaining part 12 judges whether the vehicle position information at the time of parking start has been obtained (step S602). That is, when the parking start of the vehicle is detected, the position information obtaining part 12 judges whether the information of the parking start position has been obtained. The position information obtaining part 12 can execute the judgment in the same manner as the step S502 described above.

When the position information obtaining part 12 judges that the vehicle position information at the time of parking start has not been obtained (No at the step S602), the controller 11 establishes the communication with the center 30 (step S603). The controller 11 can execute the processing for establishing the communication in the same manner as the step S504 described above.

When the vehicle is parked in the area where the communications are not available, the controller 11 can not establish the communication at the step S603. Therefore, the communicator 13 judges whether the vehicle is in the service area where the communications with the center 30 are available (step S604). That is, when the communication has been established at the step S603, the communicator 13 judges that the vehicle is in the service area for communications. When the communications have not been established, the communicator 13 judges that the vehicle is in the out-of-service area for communications.

When the communicator 13 judges that the vehicle is in the service area for communications (Yes at the step S604), the controller 11 reads out the last position information from the memory 14, and transmits to the center 30 the read-out last position information as the parking start position (step S605). Further, the controller 11 transmits the vehicle information as well at the time. Moreover in this case, the controller 11 also transmits the information indicating that the transmitted vehicle position information is the last position information, that is, the information indicating that the transmitted vehicle position information does not correspond to the actual parking start position. Next, the procedure moves to the next step (A in FIG. 6).

When judging that the vehicle is not in the service area for communications (No at the step S604), the communicator 13 judges once again whether the vehicle is in the service area. This is because the communication conditions may have been temporarily bad due to bad weather or surround constructions. If so, there is a possibility that the communication conditions are improved later. When the vehicle is not in the service area, the controller 11 can not transmit the vehicle position information and others to the center 30. Therefore, the controller 11 stores the information to be transmitted in the memory 14, and after it is judged that the vehicle is in the service area when the communication conditions are improved, executes the processing for transmitting to the center 30 via the communicator 13 the vehicle position information and the vehicle information read out from the memory 14. The position information obtaining part 12 judges that the vehicle position information at the time of parking start has been obtained (Yes at the step S602), the controller 11 obtains the vehicle position information and the restricted area information (step S606). Concretely, the controller 11 obtains the restricted area information from the map information 14*e* of the memory 14, and as well, the vehicle position information at the time of parking start from the position information obtaining part 12. The restricted area information includes the no-idling zones and the specific areas.

The controller 11 judges whether the restriction mode that restricts the processing for transmitting the vehicle position information is on (step S607). When the restriction mode is not on (No at the step S607), the procedure moves to the step for transmitting the vehicle position information (B in FIG. 6).

When the restriction mode is on (Yes at the step S607), the position judging part 11e judges whether the vehicle is in the no-idling zone (step S608). That is, the position judging part 11e judges whether the parking start position of the vehicle is in the no-idling zone, by comparing the vehicle position information obtained at the step S602 and the no-idling zones included in the restricted area information. When the position judging part 11e judges that the parking start position of the vehicle is in the no-idling zone (Yes at the step S608), the vehicle is not to be kept in the idling condition by the remote starting function. Thus, the processing for transmitting the vehicle position information is forbidden (step S610), and the procedure moves to the next step (A in FIG. 6).

When judging that the parking start position of the vehicle is not in the no-idling zone (No at the step S608), the position judging part 11e judges whether the parking start position of the vehicle is in the restricted area (step S609). Concretely, the position judging part 11e judges whether the parking start position of the vehicle is in the specific area, by comparing the vehicle position information obtained at the step S602 and the specific areas included in the restricted area information.

When the position judging part 11e judges that the parking start position of the vehicle is in the specific area (Yes at the step S609), it is assumed that the remote starting function is rarely executed. Thus, the processing for transmitting the vehicle position information is forbidden (step S610), and the procedure moves to the next step (A in FIG. 6). When the position judging part 11e judges that the parking start position of the vehicle is not in the specific area (No at the step S609), the procedure moves to the next step where the controller 11 transmits the vehicle position information (B in FIG. 6).

Next, the controller 11 establishes the communication with the center 30 (step S701). The controller 11 can execute the processing for establishing the communication and the processing for judging whether the vehicle is in the service area for communications, in the same manner as the step S603 described above.

Then, the communicator 13 judges whether the vehicle is in the service area where the communication with the center 30 is available (step S702). That is, when the communication has been established at the step S701, the communicator 13 judges that the vehicle is in the service area for communications. When the communications have not been established, the communicator 13 judges that the vehicle is in the out-of-service area for communications.

When the communicator 13 judges that the vehicle is in the service area for communications (Yes at the step S702), the controller 11 transmits to the center 30 the obtained vehicle position information and the obtained vehicle information (step S703). The vehicle position information to be transmitted is the position information obtained by the position information obtaining part 12 when the ignition has been switched off, that is, the parking start position information. The vehicle information to be transmitted is the vehicle information obtained by the vehicle information obtaining part 11a when the ignition has been switched to the off-state, and includes the information indicating that the ignition is in the off-state. The vehicle information to be transmitted may include the vehicle information that is stored in the memory 14 but has not been transmitted, besides the information indicating that the ignition is in the off-state.

When judging that the vehicle is not in the service area for communications (No at the step S702), the communicator 13 judges once again whether the vehicle is in the service area. The communicator 13 can execute the judgment in the same manner as the step S604 described above. However, when the communication conditions are changed from the condition of being in the out-of-service area to the condition of being in the service area, the controller 11 may obtain the new vehicle position information. When it is judged that the newly-obtained vehicle position information corresponds to the vehicle position information at the time when the ignition is switched off, which is stored in the memory 14, based on the comparison between the two, the controller 11 may transmit the newly-obtained vehicle position information to the center 30.

Through the processing described above, the center 30 is capable of obtaining the exact parking start position when having obtained the vehicle position information at the time of parking start, and of obtaining the rough parking start position when having not obtained the vehicle position information at the time of parking start. By transmitting in advance the vehicle position information to the center 30 just after the vehicle position information has become unavailable, the center 30 is capable of understanding the rough parking start position even when the communication between the remote starter 10 and the center 30 is unavailable at the time of parking start.

If the undetermined-information is simply transmitted to the center 30 whenever the vehicle position information is unavailable at the time of parking start, the center 30 can not execute the distance-restriction function and is required to execute the processing for confirming with the user whether to start the driving apparatus when the request for starting the driving apparatus is received. However, as in the embodiment, by transmitting to the center 30 the rough position that is not an exact position but still can be deemed as the parking start position, the center 30 can execute the distance-restriction function, and can automatically execute the processing for remote starting without the processing for confirming with the user.

Next, the vehicle information obtaining part 11a detects whether the user manually has switched the ignition condition from the off-state to the on-state (step S704). Concretely, upon reception via CAN from the power source ECU, of the signal indicating that the ignition is in the on-state while the ignition is in the off-state, the vehicle information obtaining part 11a detects that the ignition condition has been switched from the off-state to the on-state.

When the vehicle information obtaining part 11a does not detect that the ignition has been switched from the off-state to the on-state (No at the step S704), the procedure is finished without any execution of the processing.

When detecting that the ignition has been switched from the off-state to the on-state (Yes at the step S704), the vehicle information obtaining part 11a judges that the vehicle is not to be parked any more. Then, the controller 11 establishes the communication with the center 30 (step S705). Concretely, the controller 11 transmits the command of the request for communication connection to the center 30 via the communicator 13. Upon reception of the command of the request for communication connection, the center 30, if available, permits the communication connection to establish the communication. When the communication with the center 30 has been established already, the processing can be omitted.

After communication has been established, the communicator 13 periodically judges whether the vehicle is in the service area where the communications with the center 30 are available (step S706). That is, besides the processing above, the communicator 13 judges whether the communication with the center 30 is available by monitoring deterioration of the communication condition when the communications with the center 30 have been established.

When judging that the vehicle is in the service area for communications (Yes at the step S706), the communicator 13 transmits to the center 30 the vehicle position information and the vehicle information (step S707). The vehicle position information to be transmitted is the position information obtained by the position information obtaining part 12 when the ignition has been switched on, that is, the position information at the time of parking end. The vehicle information to be transmitted is the vehicle information obtained by the vehicle information obtaining part 11a when the ignition has been switched on, and includes the information indicating that the ignition is in the on-state. The vehicle information to be transmitted may include the vehicle information that is stored in the memory 14 but has not been transmitted, besides the information indicating that the ignition is in the on-state.

When judging that the vehicle is not in the service area for communications (No at the step S706), the communicator 13 judges once again whether the vehicle is in the service area. Since the communicator 13 can not transmit the vehicle position information and others to the center 30 when the vehicle is not in the service area, the controller 11 stores the information to be transmitted in the memory 14. Then, the controller 11, after it is judged that the vehicle is in the service area, executes the processing for transmitting to the center 30 via the communicator 13 the vehicle position information and the vehicle information read out from the memory 14.

As above, in the case where the vehicle is parked outside the restricted area and the vehicle position information is available when the ignition condition is manually switched to the off state, the remote starter 10 executes the processing for transmitting to the center 30 the vehicle position information obtained at the time when the ignition is switched off, besides the information indicating that the ignition has been switched off. In the case where the vehicle position information is unavailable when the ignition is switched off, the remote starter 10 executes the processing for transmitting to the center 30 the vehicle position information just before the vehicle position information has become unavailable. The remote starter 10 executes the processing shown in FIG. 6 and FIG. 7 periodically, for example, every 50 ms or 100 ms.

Figure 8:
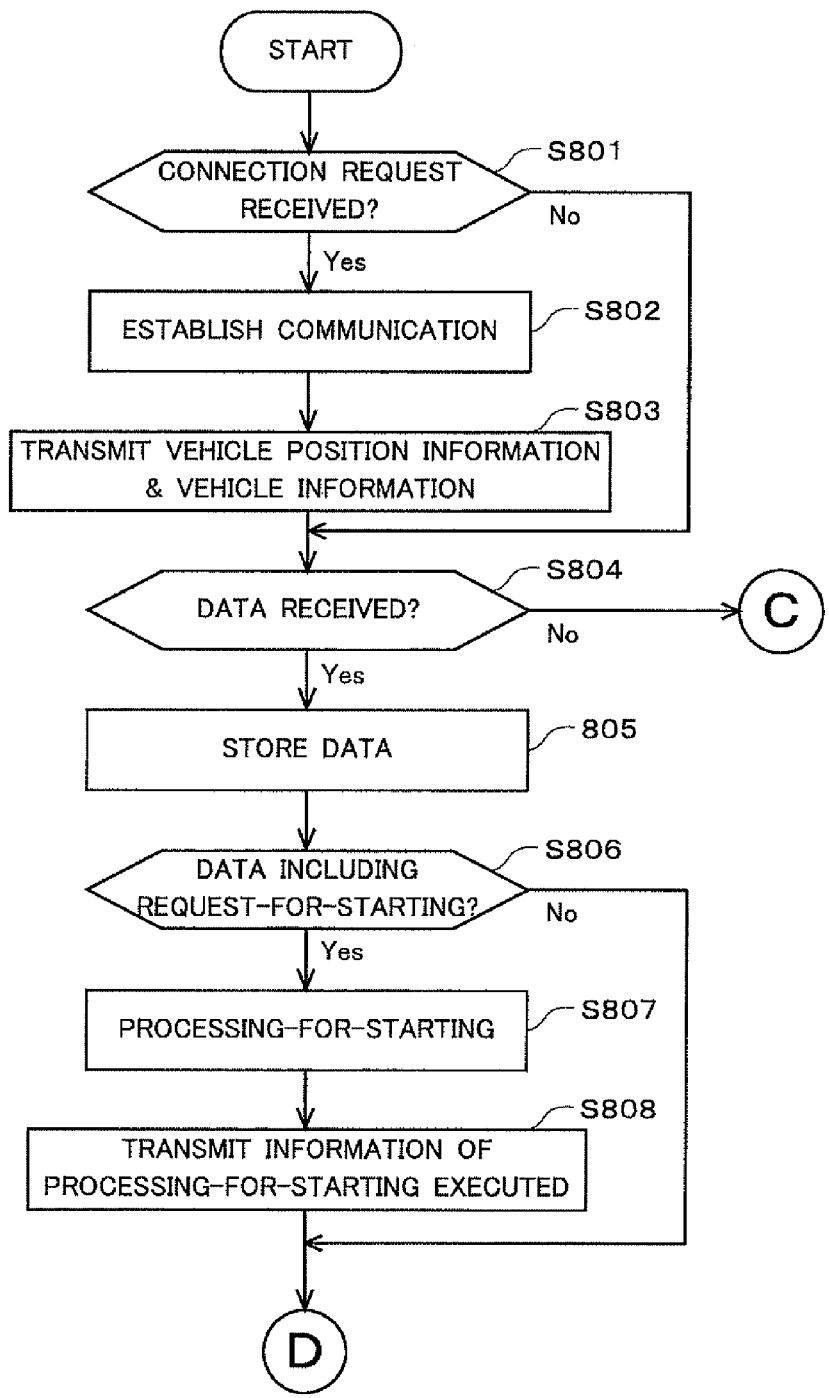
FIG. 8 shows another flowchart of processing on the remote starter of the first embodiment.
Figure 9:
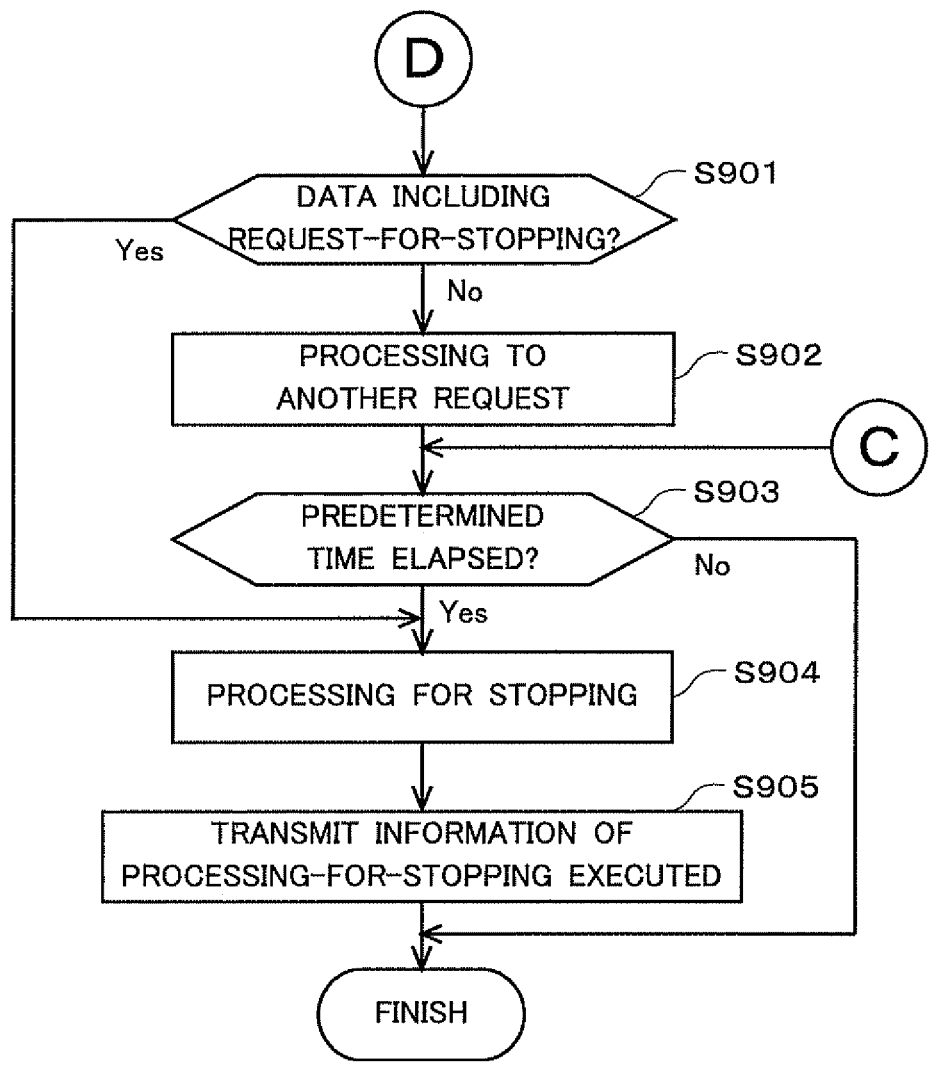
FIG. 9 shows another flowchart of processing on the remote starter of the first embodiment.

Described next is the processing on the remote starter 10 for starting the driving apparatus. Each of FIG. 8 and FIG. 9 shows a flowchart of the processing for starting on the remote starter 10.

First, the controller 11 judges whether the request for connection has been transmitted by the center 30 (step S801). The controller 11 makes this judgment based on the judgment whether the command of the request for communication connection has been received from the center 30 via the communicator 13. When the controller 11 judges that the request for communication connection has not been received (No at the step S801), the procedure moves to the step for judging whether any data have been received (step S804). In the case of judging that connection request has been received (Yes at the step S801), the controller 11, if available, permits the communication connection to establish communication (step S802).

After the communication is established, the controller 11 obtains the current vehicle position information by starting up the position information obtaining part 12, and the current vehicle information from the vehicle information obtaining part 11a. Then, the controller 11 transmits the obtained current vehicle position information and the obtained current vehicle information to the center 30 via the communicator 13 (step S803). The vehicle position information in this case is the position information obtained by the position information obtaining part 12 when the command of the request for communication connection is received from the center 30. The vehicle information in this case is the vehicle information obtained by the vehicle information obtaining part 11a when the command of the request for communication connection is received, and the vehicle information stored in the memory 14 but not having been transmitted. In this processing, the controller 11 may transmit only the vehicle position information, not the vehicle information.

Next, the controller 11 judges whether any data have been received from the center 30 (step S804). When the controller 11 judges that any data have not been received (No at the step S804), the procedure moves to the step, described later, for judging whether the predetermined period of time has elapsed (through C in FIG. 8 to step S903).

When judging that some data have been received (Yes at the step S804), the controller 11 stores the received data 14d in the memory 14 (step S805). The information judging part 11b may store the data 14d in the memory 14 after judging the contents of the data, or may store the data 14d without the judgment. The received data include various kinds of commands, for example, the commands of the request for starting the driving apparatus and various apparatuses, and commands of the request for transmitting the vehicle position information and the vehicle information.

Next, the information judging part 11b judges whether the data received from the center 30 include the command of the request for starting the driving apparatus (step S806). The information judging part 11b makes this judgment by judging the contents of the received data. When the contents of the received data are judged for storage in the memory 14, another processing for judging whether the command of the request for starting is stored in the memory 14 may be executed instead.

When the received data include the command of the request for starting the driving apparatus (Yes at the step S806), the starting controller 11c executes the processing for starting the driving apparatus (step S807). Concretely, upon reception of the command of the request for starting, the starting controller 11c transmits the signal for starting via CAN to the power source ECU. The power source ECU makes an ACC relay, an ignition relay and a starter relay be in the on-state, and transmits an ACC signal, an ignition signal and a starter signal to an engine ECU. Upon reception of these signals, the engine ECU starts a starter motor to start an engine. This enables remote control to start the engine. In the case of the vehicle equipped with a so-called immobilizer, the starting controller 11c executes the processing for certification with the ECU that controls the immobilizer.

After executing the processing for starting the driving apparatus based on the command of the request for starting, the controller 11 transmits to the center 30 via the communicator 13 the information indicating that the processing for starting has been executed (step S808), and the procedure moves to the next step (D in FIG. 8).

When the information judging part 11b judges that the data received from the center 30 do not include any command of the request for starting the driving apparatus (No at the step S806), the procedure moves to the next step without execution of the processing for starting by the starting controller 11c (D in FIG. 8).

Next, the information judging part 11b judges whether the data received from the center 30 include the command of the request for stopping the driving apparatus (step S901). The information judging part lib makes this judgment by judging the contents of the received data, as well. When the received data include the command of the request for stopping the driving apparatus (Yes at the step S901), the starting controller 11c executes the processing for stopping the driving apparatus (step S904). The processing for stopping is described later.

When the information judging part 11b judges that the data received from the center 30 do not include any command of the request for stopping the driving apparatus (No at the step S901), the starting controller 11c executes the processing corresponding to another request without execution of the processing for stopping at this point (step S902). The processing corresponding to another request is executed when the received data include a command other than the ones of the request for starting and stopping the driving apparatus (hereafter, referred to as "another command"), as a response to the received another command.

That is, the information judging part 11b judges whether the received data include another command. The starting controller 11c executes the processing as the response to the command, if any. In an example, when the received data include the command for locking a door, the starting controller 11c executes the processing for locking the door. When the received data include the command for unlocking the door, the starting controller 11c executes the processing for unlocking the door. When the received data include the command of the request for transmitting the vehicle information, the starting controller 11c executes the processing for transmitting the requested vehicle information to the center 30 via the communicator 13. When the information judging part 11b judges that the received data do not include any another commands, there is nothing to be done at this step.

Next, the timer 11d judges whether the predetermined period of time has elapsed since the starting of the driving apparatus (step S903). The timer 11d starts measuring time from the starting of the driving apparatus, and judges whether the predetermined period of time has elapsed. The predetermined period of time is, for example, a certain amount of elapsed time since the starting of the driving apparatus, that is, a predetermined so-called warming-up time. For example, 10 minutes may be set as the warming-up time. Or, 20 minutes at maximum may be set as the total time of multiple warming-up operations. However, the predetermined period of time is not limited to these above. An appropriate period of time is permitted to be set.

When the timer 11d judges that the predetermined period of time has elapsed since the starting (Yes at the step S903), the starting controller 11c executes the processing for stopping the driving apparatus (step S904). In an example of the processing for stopping, the starting controller 11c transmits the signal for stopping to the power source ECU via CAN, and the power source ECU makes the ACC relay, the ignition relay and the starter relay be in the off-state to stop the engine drive. This enables remote control to stop the engine.

Then, after executing the processing for stopping the driving apparatus, the controller 11 transmits to the center 30 via the communicator 13 the information indicating that the processing for stopping has been executed (step S905), and the procedure of the processing for remote starting is finished.

When the timer 11d judges that the predetermined period of time has not elapsed (No at the step S903), the procedure of the processing for remote starting is finished without execution of the processing for stopping.

After the communication with the center 30 has been established, the center 30 executes the processing for terminating the communication. The processing for termination on the center 30 is described later.

<1-6. Processing on Mobile Terminal>

Figure 10A:
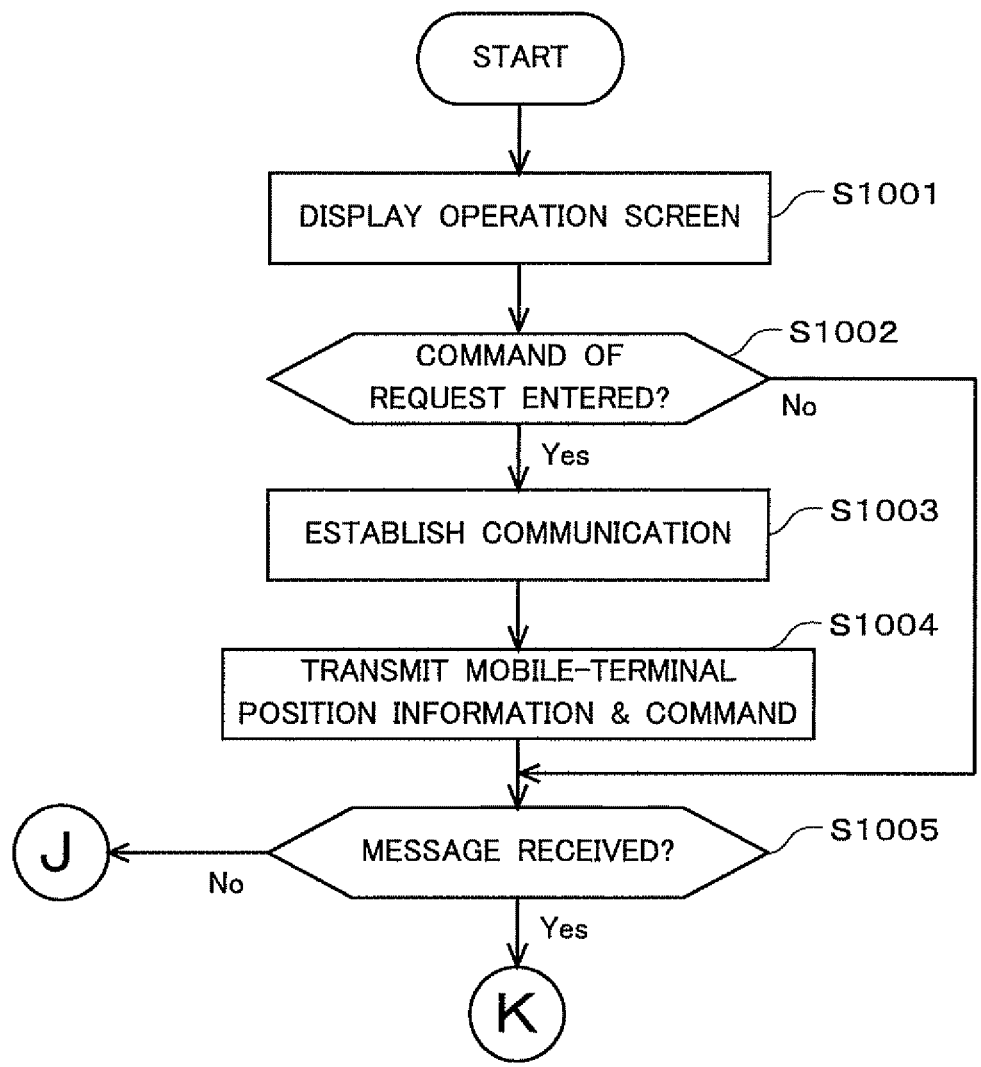
FIG. 10A shows a flowchart of processing on the mobile terminal.
Figure 10B:
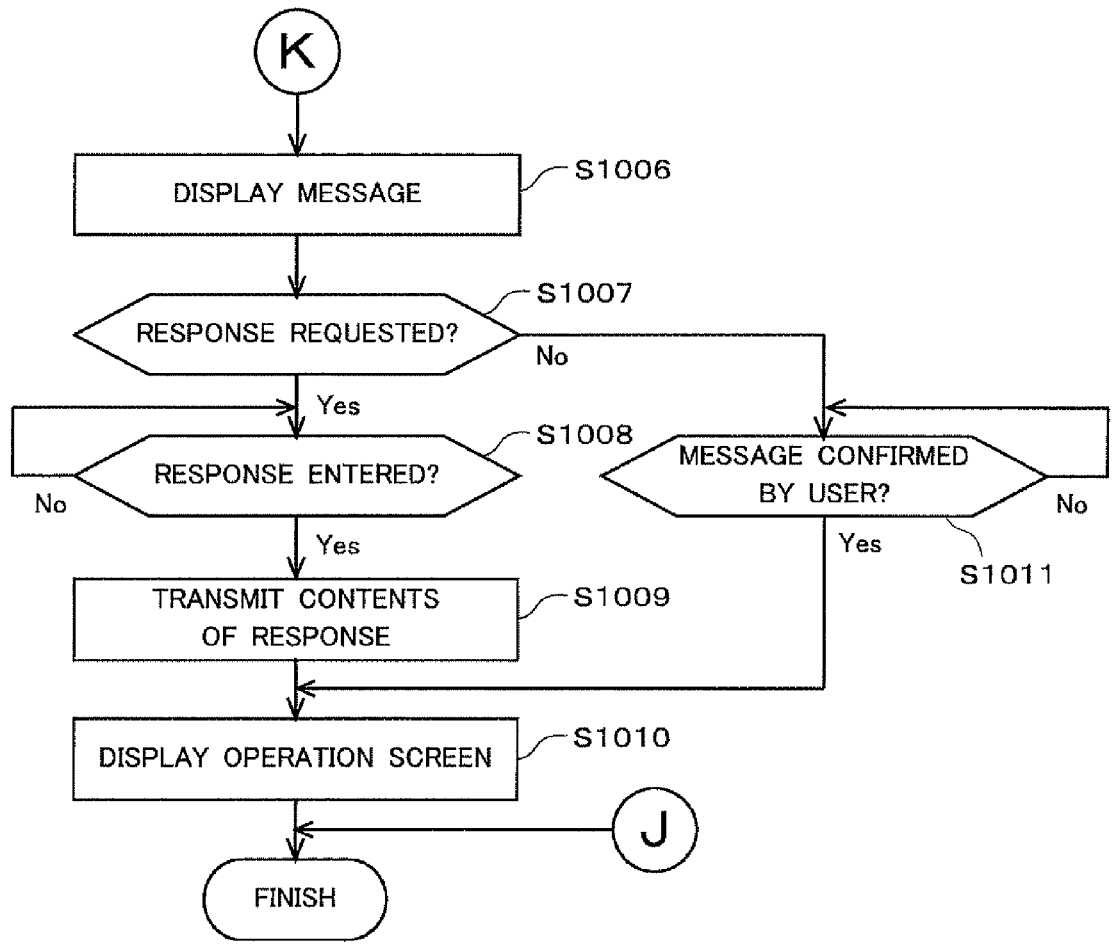
FIG. 10B shows another flowchart of processing on the mobile terminal.

Next, the processing on the mobile terminal 20 is described. Each of FIG. 10A, FIG. 10B, FIG. 11A and FIG. 11B shows a flowchart of the processing on the mobile terminal 20. Described first is the processing for remote starting by use of the mobile terminal 20. Each of FIG. 10A and FIG. 10B shows the flowchart of the remote starting processing on the mobile terminal 20.

The remote starting processing by the mobile terminal 20 starts with running the application 24d for the remote starting stored in the mobile terminal 20. After the application 24d of the mobile terminal 20 is run, a main operation screen for operation for remote starting is displayed on the display 25 (step S1001). The display controller 21b displays the operation screen on the display 25 by reading out the operation screen stored in the application 24d.

Next, the controller 21 judges whether any command of a request to the center 30 has been entered by the operation of the user on the displayed operation screen (step S1002). When the controller 21 judges that a request command has been entered, the information judging part 21a judges the contents of the entered command. The command to be entered is, for example, of the request for starting or stopping the driving apparatus.

When judging that the request command has been entered (Yes at the step S1002), the controller 21 establishes the communication with the center 30 (step S1003). Concretely, the controller 21 transmits the command of the request for communication connection to the center 30 via the communicator 23. Upon reception of the command of the request for communication connection, the center 30, if available, permits the communication connection to establish the communication.

Next, the controller 21 transmits the entered request command to the center 30 via the communicator 23 (step S1004). Prior to transmission of the entered request command, the position information obtaining part 22 obtains the position information of the mobile terminal 20. Then, the controller 21 transmits the obtained mobile-terminal position information besides the entered request command. When the controller 21 judges that the request command has not been entered (No at the step S1002), the procedure moves to the next step without any execution of the processing for transmitting the request command or others.

Next, the controller 21 judges whether any messages have been received from the center 30 (step S1005). Here, the controller 21 makes the judgment including whether any data have been received from the center 30, and whether the received data, if any, are messages. Concretely, the information judging part 21a makes this judgment on whether the received data are messages. The messages to be received from the center 30 are, for example, a confirmation message relevant to continuation of the processing for remote starting, and a response message to the information requested by the user to the center. Concretely, these messages are, for example, the confirmation message for confirming whether to continue the starting in the case where the restriction conditions for the restriction function are not satisfied, and the response message for transmitting the contents of the vehicle information that has been inquired by the user to the center.

When the controller 21 judges that the message has not been received (No at the step S1005), the procedure of the processing for remote starting is finished without any execution of the following processing (J in FIG. 10A). When the controller 21 judges that the message has been received (Yes at the step S1005), the procedure moves to the next step (K in FIG. 10A). Then, the controller 21 displays an appropriate message on the display 25 (step S1006).

The information judging part 21a judges whether the received message is for requesting user's response (step S1007). The message for requesting user's response, in the examples described above, is the confirmation message for confirming whether to continue the starting. The message not for requesting user's response is the response message for transmitting the contents of the vehicle information.

When the information judging part 21a judges that the received message is for requesting user's response (Yes at the step S1007), the controller 21 monitors whether the user's response has been entered (step S1008). The response is entered when the user makes operations on the operation screen. The step for monitoring the user's response is repeated until when it is judged that the response has been entered (No at the step S1008).

When judging that the response has been entered (Yes at the step S1008), the controller 21 transmits the contents of the response to the center via the communicator 23 (step S1009). Then, the controller 21 redisplays the operation screen on the display (step S1010).

When the information judging part 21a judges that the received message is not for requesting the user's response at the step for judging the existence of the response request (No at the step S1007), the controller 21 monitors whether the user has confirmed the displayed message (step S1011). The message not for requesting the user's response is only for presenting the contents to the user. Thus, the controller 21 monitors simply whether the user has confirmed the message. However, the step for monitoring may be omitted, if not needed.

The controller 21 repeats the step for monitoring until it is judged that the user has confirmed the message (No at the step S1011). When judging that the user has confirmed the message (Yes at the step S1011), the controller 21 redisplays the operation screen on the display (step S1010). In an example, the user touches a confirmation button on the operation screen to express confirmation of the message. In this case, the controller 21 judges whether the message has been confirmed by judging whether the confirmation button has been touched.

Later, the user can execute again the processing for remote starting by re-executing the processing from the start. The user can complete the processing for remote starting by shutting down the application 24d for remote controlling.

The communication with the center 30 is terminated not just when the application 24d for remote controlling is shut down, but are automatically terminated when transmitting necessary data to and receiving necessary data from the center 30 are completed. That is, the communications are automatically terminated in the case where it is judged that after the controller 21 has established the communications at the step S1003, a series of responses from the center in terms of the request command transmitted at the step S1004 have been completed. The case where the responses from the center 30 have been completed is the case such as where time information at the time of starting has been received or where the message not for requesting the user's response has been received.

Figure 11A:
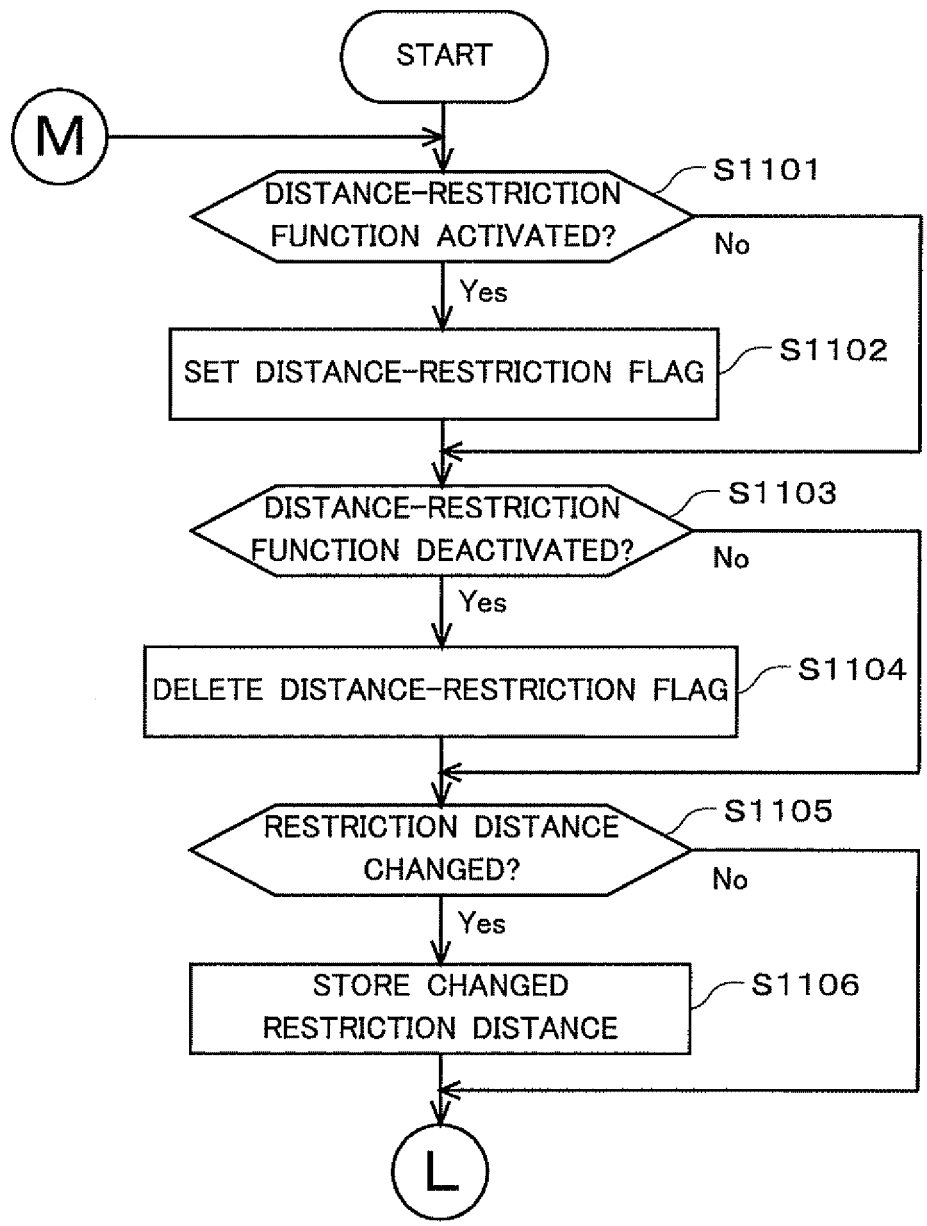
FIG. 11A shows another flowchart of processing on the mobile terminal.
Figure 11B:
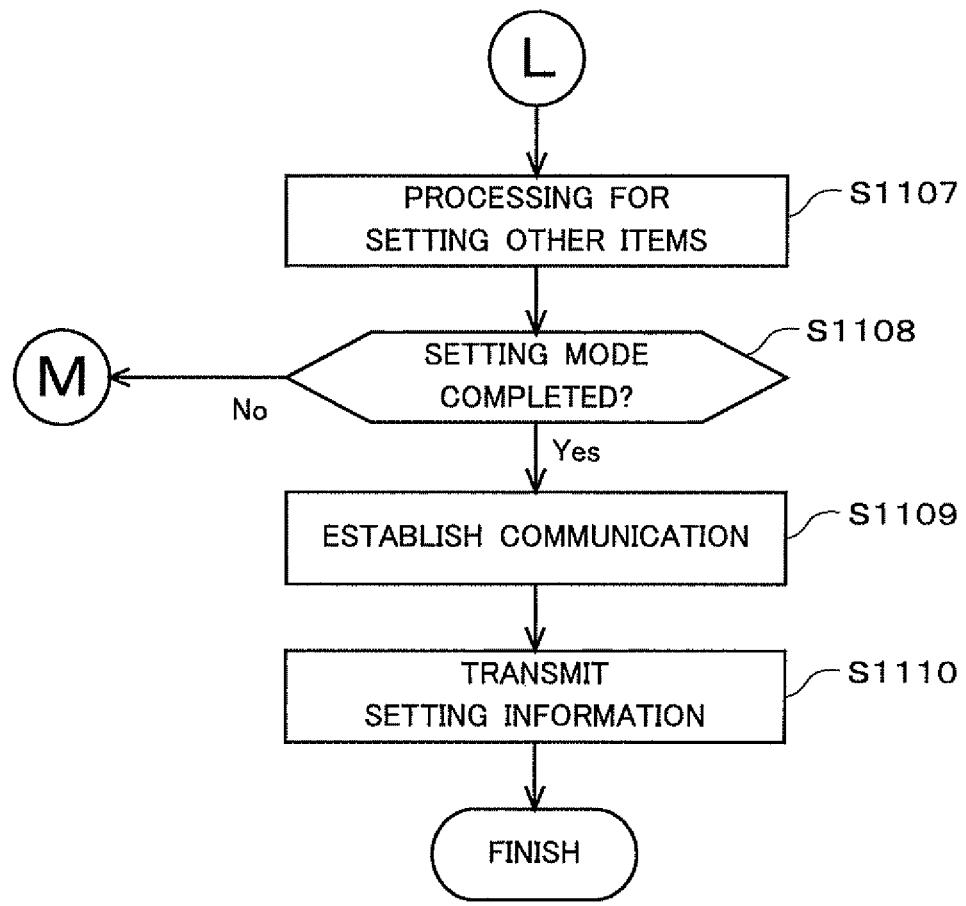
FIG. 11B shows another flowchart of processing on the mobile terminal.

Described next is the processing for setting the restriction function and for changing the restriction conditions by use of the mobile terminal 20. Each of FIG. 11A and FIG. 11B shows a flowchart of the processing for setting the restriction functions and for changing the restriction conditions in the case where the distance-restriction function is adopted as the restriction function.

The processing for setting the restriction functions and for changing the restriction conditions starts when the user selects the setting mode of the mobile terminal. When the setting mode is selected, the restriction function setting part 21c judges whether the distance-restriction function of the mobile terminal 20 is activated (step S1101). When the distance-restriction function is activated (Yes at the step S1101), the restriction function setting part 21c sets the flag indicating that the distance-restriction function is activated (step S1102). When the distance-restriction function is not activated (No at the step S1101), the flag is not set.

Next, the restriction function setting part 21c judges whether the distance-restriction function is deactivated (step S1103). When the distance-restriction function is deactivated (Yes at the step S1103), the restriction function setting part 21c deletes the flag for activating the distance-restriction function (step S1104). When the distance-restriction function is not deactivated (No at the step S1103), the flag is not deleted.

Next, the restriction function setting part 21c judges whether the restriction distance as one of the restriction conditions has been changed (step S1105). When the restriction distance has been changed (Yes at the step S1105), the restriction function setting part 21c stores the changed restriction distance in the memory 24 (step S1106). Then, the procedure moves to the next step (L in FIG. 11A). When the restriction distance is not changed (No at the step S1105), the processing for changing the restriction conditions is not executed (L in FIG. 11A).

Next, the restriction function setting part 21c executes the processing for setting other items (step S1107). The processing for setting other items is for setting or changing the restriction conditions other than the restriction distance. One of the restriction conditions other than the restriction distance is, for example, the restriction condition relevant to the position-restriction function. When the processing for setting or changing the restriction conditions other than the restriction distance is executed, the restriction function setting part 21c stores the setting or the restriction conditions after change in the memory 24. When the processing for setting or changing is not executed, this step can be omitted.

Next, the restriction function setting part 21c judges whether the setting mode has been completed (step S1108). When the restriction function setting part 21c judges that the setting mode has been completed (Yes at the step S1108), the controller 21 establishes the communication with the center 30 (step S1109). The communication is established in the same manner as the processing described above. When the communication with the center 30 has been established already, this step can be omitted.

The controller 21 transmits to the center 30 via the communicator 23 the setting information 24c that has been read out from the memory 24 after completion of the processing for setting (step S1110), and then, the procedure of the processing for setting the restriction functions and for changing the restriction conditions is finished. When judging that the setting mode has not been completed (No at the step S1108), the restriction function setting part 21c re-executes the procedure starting from the processing for judging whether the distance-restriction function is activated (through M in FIG. 11B to the step S1101).

<1-7. Processing on Center>

Figure 12:
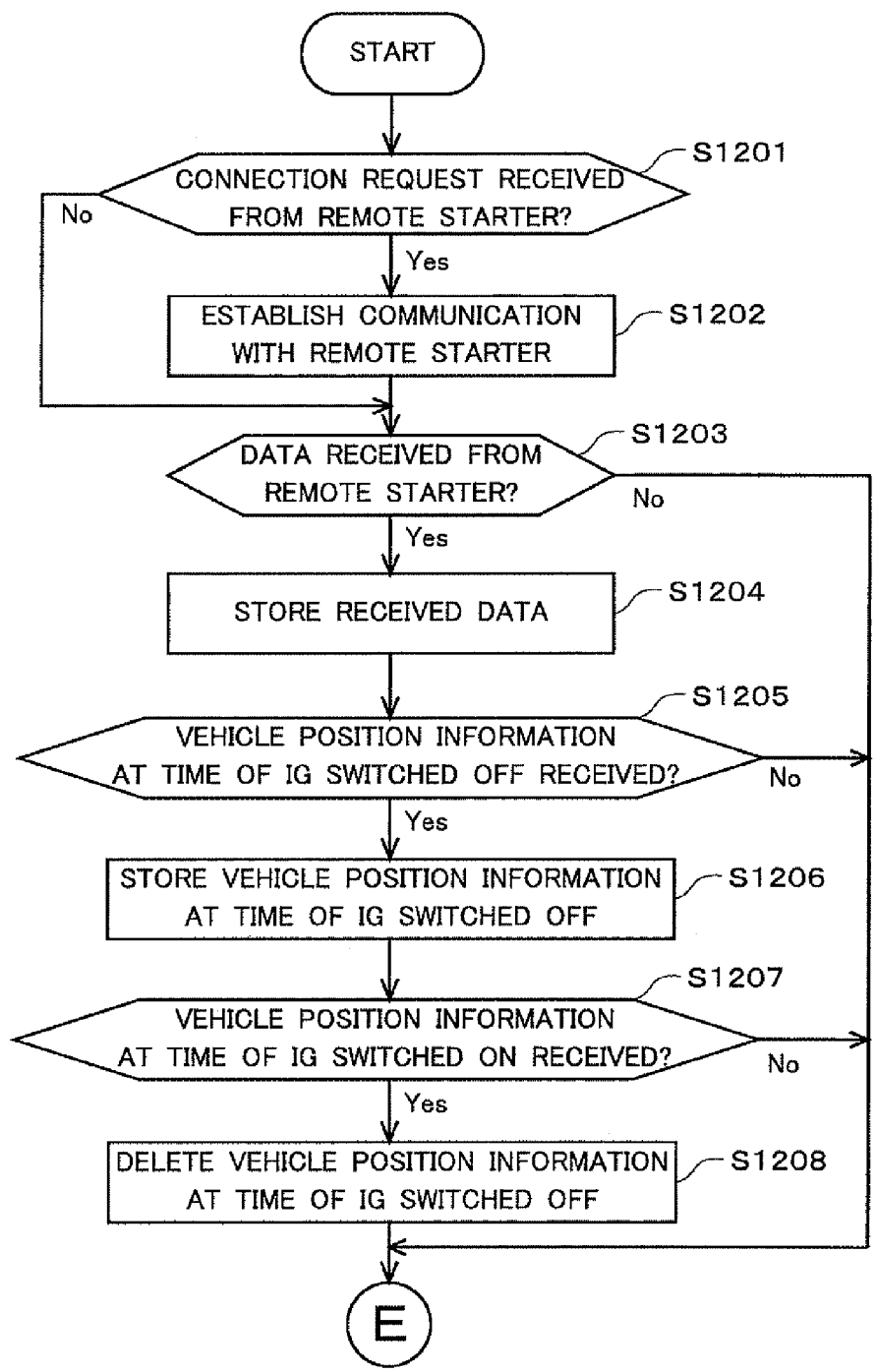
FIG. 12 shows a flowchart of processing on the center.
Figure 13:
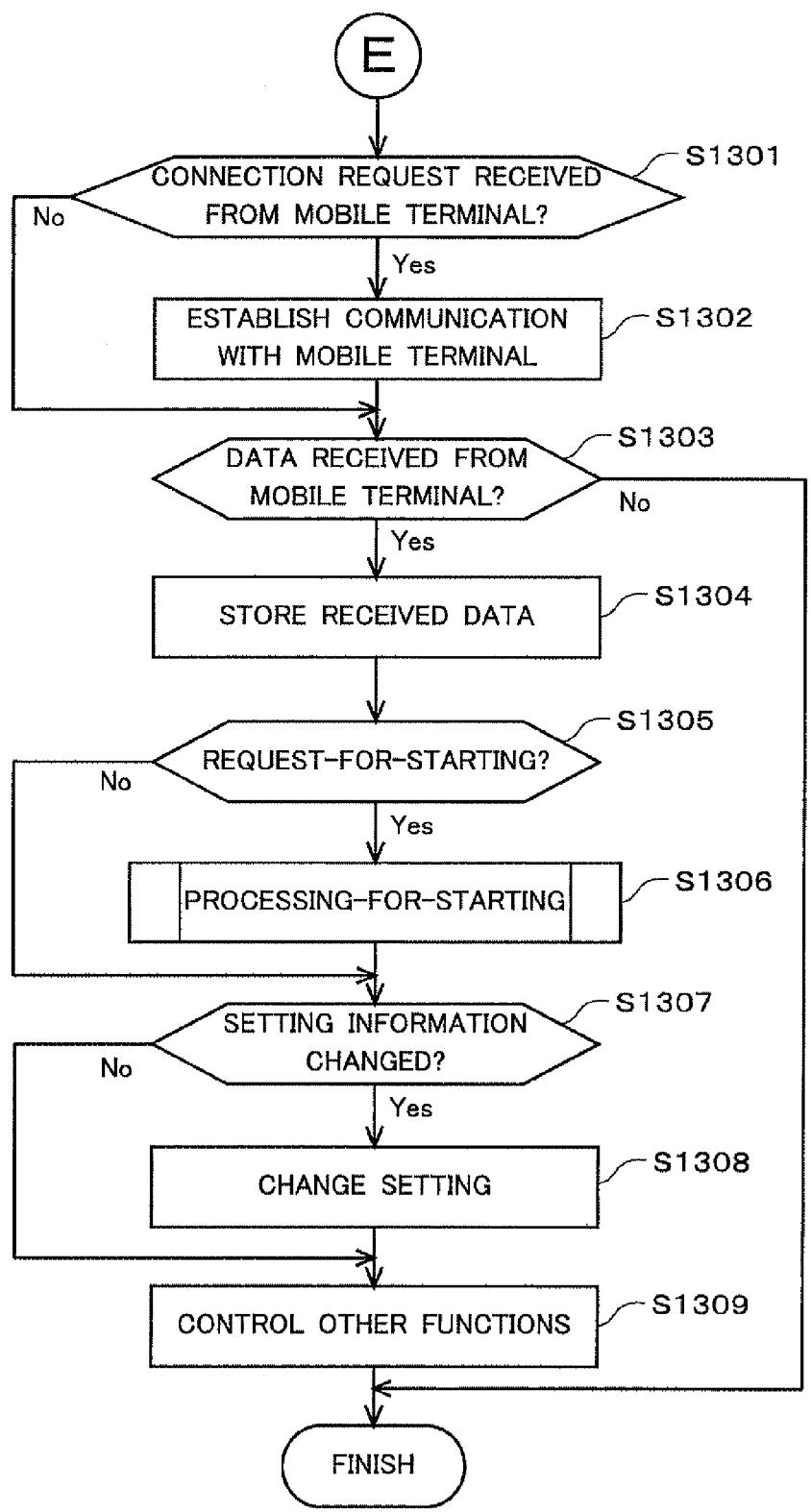
FIG. 13 shows another flowchart of processing on the center.

Next, the processing on the center 30 is described. Each of FIG. 12, FIG. 13, FIG. 14, FIG. 15 and FIG. 16 shows a flowchart of the processing on the center 30. Described first is the processing for remote starting by communicating with the remote starter 10 and the mobile terminal 20 for transmitting and receiving information. Each of FIG. 12 and FIG. 13 shows the flowchart of the processing for remote starting on the center 30.

The center 30 judges whether the request for connection has been received from the remote starter 10 (step 1201). The controller 31 makes this judgment based on the judgment whether the command of the request for communication connection has been received from the remote starter 10. When judging that the request for connection has been received from the remote starter 10 (Yes at the step S1201), the controller 31, if available, permits the communication connection with the remote starter 10 to establish the communication (step S1202). When the controller 31 judges that the request for connection has not been received from the remote starter 10 (No at the step S1201), the procedure moves to the next step without any execution of the processing for establishing the communication.

Next, the controller 31 judges whether any data have been received from the remote starter 10 (step S1203). Concretely, the controller 31 judges whether any data have been received via the communicator 32, or whether the source that has transmitted the data, if any, is the remote starter 10.

When judging that some data have been received from the remote starter 10 (Yes at the step S1203), the controller 31 stores the received data in the memory 33 (step S1204). Then, the information judging part 31a judges whether the reception data 33f include the vehicle position information 33b obtained at the time when the ignition has been switched off, that is, the vehicle position information at the time of parking start (step S1205).

When the information judging part 31a judges that the reception data 33f include the vehicle position information 33b at the time when the ignition is switched off (Yes at the step S1205), the controller 31 stores in the memory 33 the vehicle position information 33b as "the vehicle position information 33b at the time when the ignition is switched off," that is, the parking start position (step S1206). At the time, the information judging part 31a confirms whether the reception data include the information indicating that the vehicle position information is not equal to the actual parking start position, and, if any, stores the information besides the vehicle position information 33b. When the reception data 33f correspond to the undetermined-information, the undetermined-information is stored in the memory 33 as "the vehicle position information 33b at the time when the ignition is switched off."

Next, the information judging part 31a judges whether the reception data 33f include the vehicle position information 33b obtained at the time when the ignition has been switched on (step S1207). When the information judging part 31a judges that the reception data 33f include the vehicle position information 33b at the time when the ignition is switched on (Yes at the step S1207), the controller 31 deletes "the vehicle position information 33b at the time when the ignition is switched off" stored in the memory 33 (step S1208). Then, the procedure moves to the next step on the controller 31 (E in FIG. 12).

When the controller 31 judges that any data have not been received from the remote starter 10 (No at the step S1203), the procedure moves to the next step without any execution of the processing to respond to the judgment (E in FIG. 12). When the information judging part 31a judges that the reception data 33f do not include the vehicle position information 33b at the time when the ignition is switched off (No at the step S1205), and when the reception data 33f do not include the vehicle position information 33b at the time when the ignition is switched on (No at the step S1207), the procedure moves to the next step without any execution of the processing to respond to the judgment (E in FIG. 12).

Next, the center 30 judges whether the request for connection is transmitted by the mobile terminal 20 (step 1301). The controller 31 makes this judgment based on the judgment whether the command of the request for communication connection has been received from the mobile terminal 20. When judging that the request for connection has been received from the mobile terminal 20 (Yes at the step S1301), the controller 31, if available, permits the communication connection with the mobile terminal 20 to establish communication (step S1302). When the controller 31 judges that the request for connection has not been received from the mobile terminal 20 (No at the step S1301), the procedure moves to the next step without any execution of the processing for establishing communication.

Next, the controller 31 judges whether any data have been received from the mobile terminal 20 (step S1303). Concretely, the controller 31 judges whether any data have been received via the communicator 32, or whether the source that has transmitted the data, if any, is the mobile terminal 20.

When judging that some data have been received from the mobile terminal 20 (Yes at the step S1303), the controller 31 stores the received data in the memory 33 (step S1304). The received data include the mobile-terminal position information. When the controller 31 judges that any data have not been received from the mobile terminal 20 (No at the step S1303), the procedure of the processing for remote starting is finished without any execution of the processing to respond to the judgment.

After the data received from the mobile terminal 20 are stored, the information judging part 31a judges whether the reception data 33f include the command 33g of the request for starting (step S1305). When the information judging part 31a judges that the reception data 33f include the command 33g of the request for starting (Yes at the step S1305), the controller 31 executes the processing for starting (step S1306). The processing for starting is detailed later. When the information judging part 31a judges that the reception data 33f do not include the command 33g of the request for starting (No at the step S1305), the procedure moves to the next step without any execution of the processing for starting.

Next, the information judging part 31a judges whether the reception data 33f include the data indicating that the setting information 33d is to be changed (step S1307). When the information judging part 31a judges that the reception data 33f include the data indicating that the setting information 33d is to be changed (Yes at the step S1307), the controller 31 changes the setting information 33d based on the received data, and stores the changed setting information 33d in the memory 33 (step S1308). That is, the controller 31 executes the processing for rewriting the setting information 33d stored in the memory 33 to include the changed contents. When the information judging part 31a judges that the reception data 33f do not include any data indicating that the setting information 33d is to be changed (No at the step S1307), the procedure moves to the next step without any execution of the processing for changing the setting.

Next, the controller 31 executes the control of other functions (step S1309). Concretely, first, the information judging part 31a judges whether the reception data 33f include another command 33g. When the information judging part 31a judges that the reception data 33f include another command 33g, the controller 31 executes the processing to respond to the corresponding command 33g. When the information judging part 31a judges that the reception data 33f do not include another command 33g, the controller 31 does not execute the processing. Then, the procedure of the processing for remote starting on the center 30 is finished.

Figure 14:
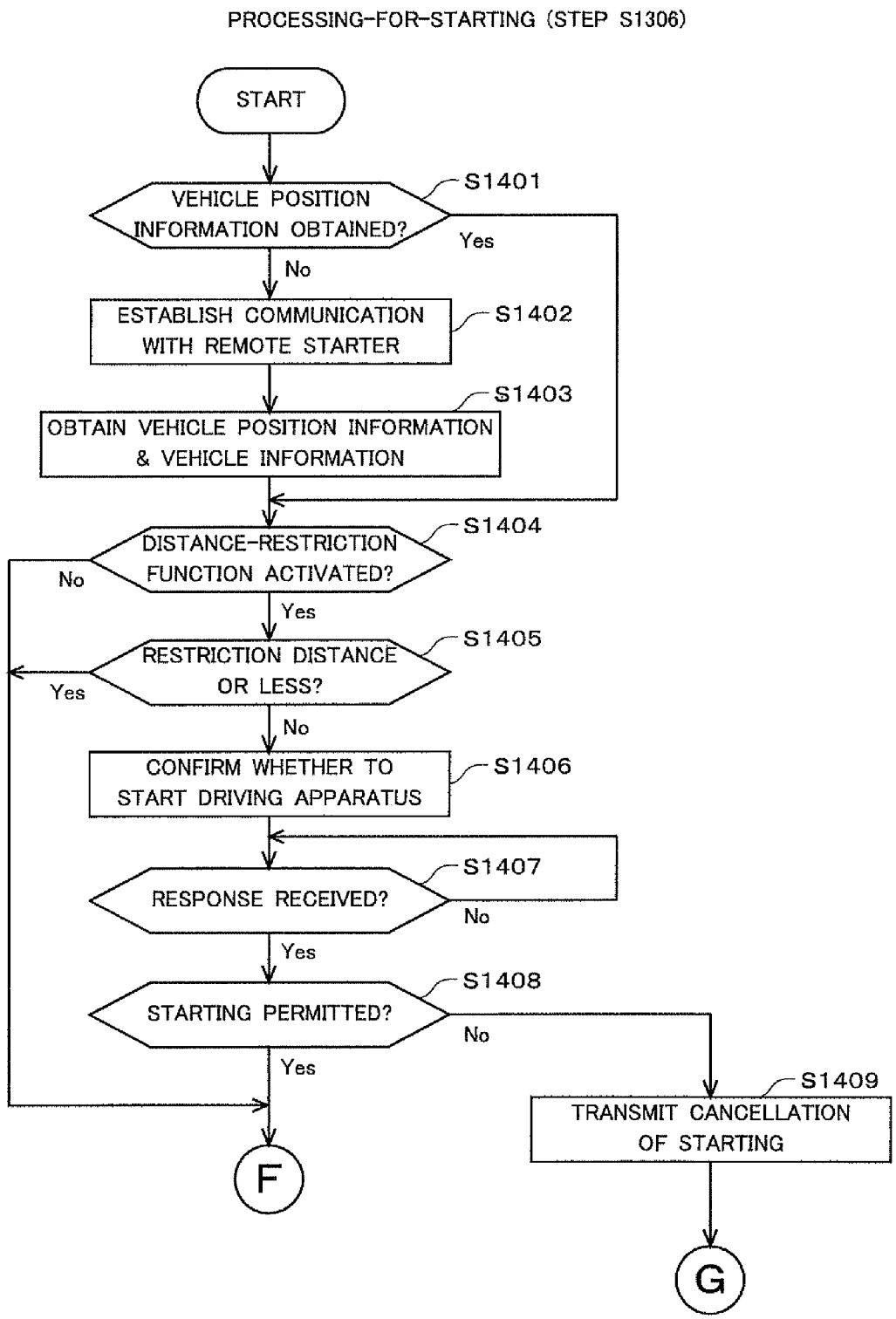
FIG. 14 shows another flowchart of processing on the center.
Figure 15:
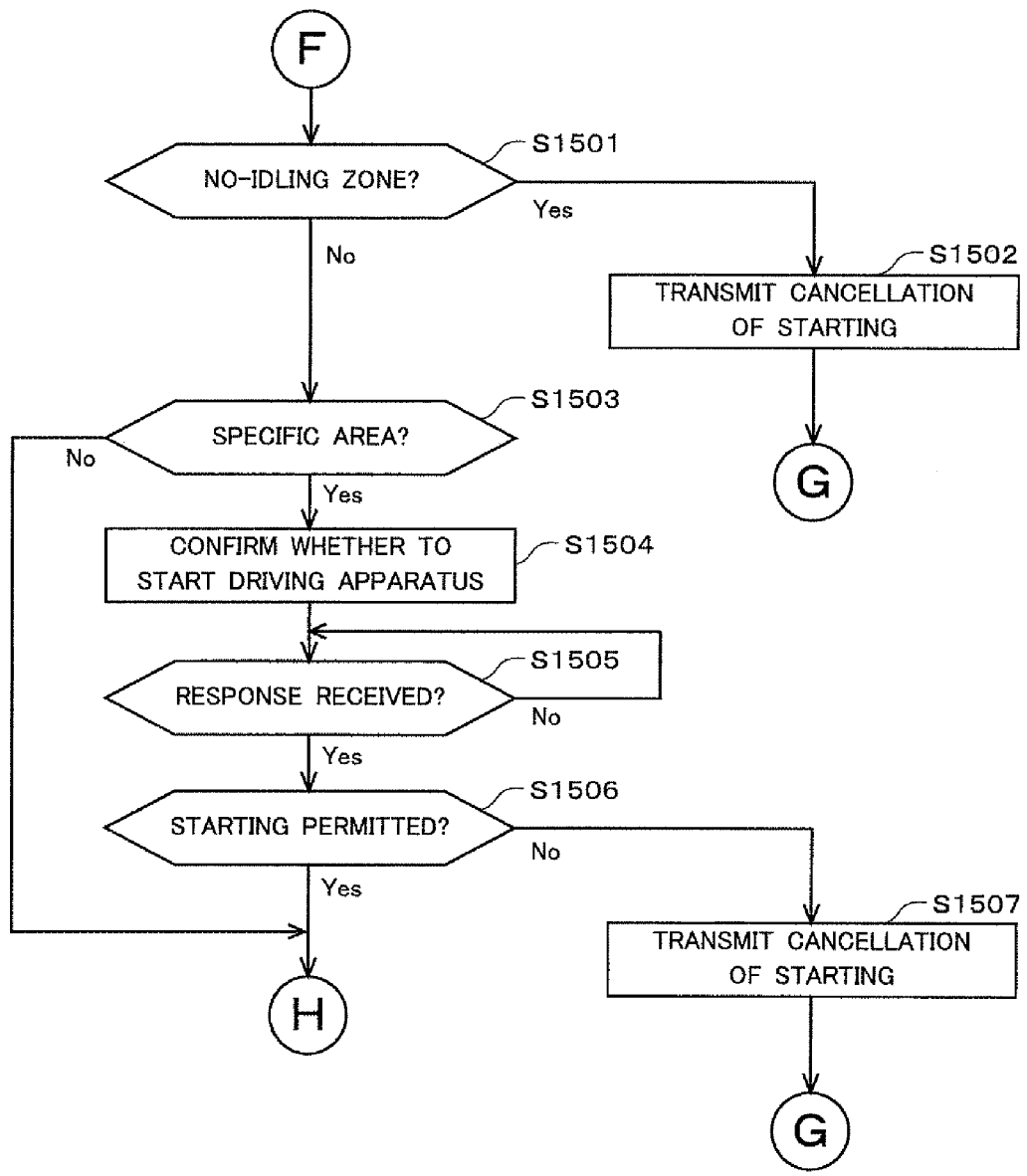
FIG. 15 shows another flowchart of processing on the center.
Figure 16:
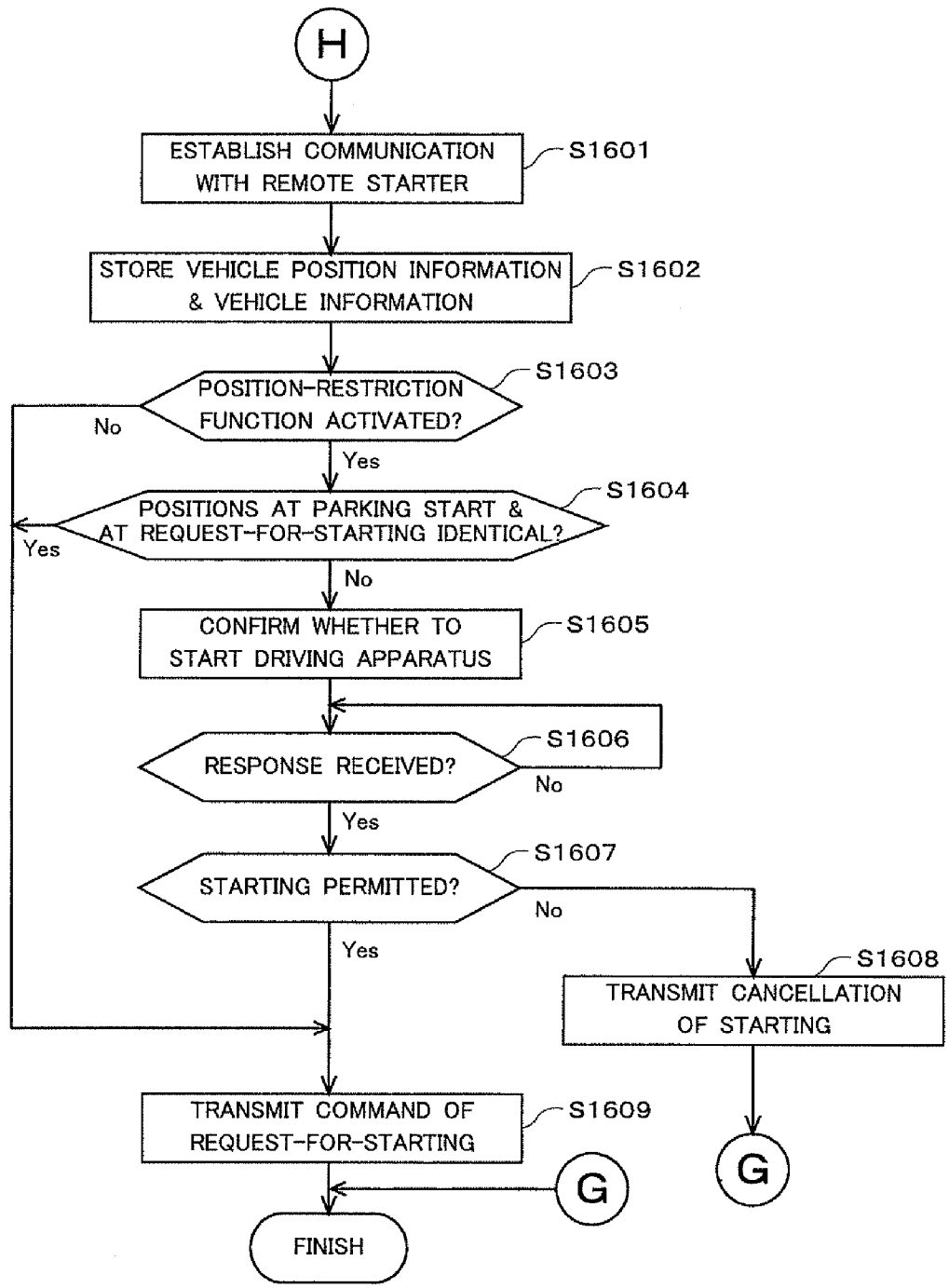
FIG. 16 shows another flowchart of processing on the center.

Described next is the processing for starting executed by the controller 31 (step S1306). Each of FIG. 14, FIG. 15 and FIG. 16 shows a flowchart of the processing for starting executed by the controller 31.

After the processing for starting is started, the controller 31 first judges whether the vehicle position information has been obtained (step S1401). In the embodiment, when the vehicle under the restriction mode of the remote starter 10 being activated is parked in the restricted area, the processing for transmitting the vehicle position information is forbidden. In this case, the center 30 may not obtain the vehicle position information. Therefore, the controller 31 judges whether the vehicle position information at the time of parking start has been obtained from the remote starter 10 at the step S1401.

When the controller 31 judges that the vehicle position information has been obtained (Yes at the step S1401), the procedure moves to the next step of the processing for starting without any execution of the processing for communications with the remote starter 10. When judging that the vehicle position information has not been obtained (No at the step S1401), the controller 31 executes the processing for obtaining the vehicle position information so as to execute the following steps of the processing for starting. First, the controller 31 transmits the command of the request for communication connection to the remote starter 10 via the communicator 32, and establishes communication with the remote starter 10 (step S1402).

After the communication is established, the controller 31 obtains the vehicle position information and the vehicle information from the remote starter 10 via the communicator 32 (step S1403). The vehicle position information received above is the vehicle position information that has been transmitted at the step S803 in FIG. 8, and indicates the parking position at the time when the remote starting has been requested. That is, the remote starter 10 is on standby while the ignition is in the off-state, and the communicator 13 is only activated. After the communication with the center 30 is established, the remote starter 10 obtains the vehicle position information by activating the controller 11 and the position information obtaining part 12, and then transmits the obtained vehicle position information to the center 30. The obtained vehicle position information is stored in the memory 33 as the vehicle position information 33b (that is, the parking start position).

As above, in the configuration of the embodiment, the processing on the remote starter 10 for transmitting the vehicle position information to the center 30 is forbidden when the vehicle is parked in the restricted area under the condition that the restriction mode of the remote starter 10 is activated. However, the center 30 needs to judge whether to transmit the request for starting when the user makes the request for starting. Therefore, in the configuration of the embodiment, the center 30 communicates with the remote starter 10 to make the request for transmitting the vehicle information.

The case where the center 30 has not obtained the parking start position when receiving the request for starting from the mobile terminal 20 may be occurred when the vehicle is parked in the restricted area, or when the remote starter 10 is not capable of transmitting the vehicle position information because of the remote starter 10 being in the out-of-service area for communications. In either case, it is undesirable that the center 30 transmit the request for starting to the remote starter 10. Therefore, when the parking start position has not been obtained, transmitting the request for starting may be forbidden without establishing the communication with the remote starter 10 to make the request for transmitting the vehicle information. In this case, it is desirable that the data indicating the cancellation of the remote starting be transmitted to the mobile terminal 20 instead of execution of the step S1402 and the step S1403. This further reduces the communication costs between the remote starter 10 and the center 30.

After the vehicle position information is obtained, the starting restricting part 31b judges whether the distance-restriction function is activated (step S1404). In the setting information 33d stored in the memory 33 of the center 30, the distance-restriction function is activated as initial settings. However, when the distance-restriction function is activated or deactivated on the mobile terminal 20, and when such information is transmitted as the setting information to the center 30, the setting information 33d is rewritten to the newly transmitted setting information. The starting restricting part 31b can judge whether the distance-restriction function is activated or deactivated in reference to the stored setting information 33d.

When the starting restricting part 31b judges that the distance-restriction function is not activated (No at the step S1404), the procedure of the controller 31 moves to the step for the processing for starting (F in FIG. 14). When judging that the distance-restriction function is activated (Yes at the step S1404), the starting restricting part 31b judges whether the distance between the position of the mobile terminal 20 and the vehicle position is equal to or shorter than the restriction distance (step S1405). Concretely, the starting restricting part 31b calculates the distance between the position of the mobile terminal 20 and the vehicle position by comparing the mobile-terminal position information 33c at the time of the request for starting and the vehicle position information 33b at the time when the ignition is switched off (at the time of parking start) that are stored in the memory 33. Then, the starting restricting part 31b compares the calculated distance and the restriction distance by reading out the restriction distance from the setting information 33d stored in the memory 33.

When the starting restricting part 31b judges that the calculated distance is equal to or shorter than the restriction distance as a result of the comparison (Yes at the step S1405), the procedure moves to the next step of the processing for starting (F in FIG. 14). When the starting restricting part 31b judges that the calculated distance is longer than the restriction distance (No at the step S1405), the procedure of the controller 31 moves to the step for executing the processing for confirming whether to continue the processing for starting (step S1406). Concretely, the controller 31 transmits to the mobile terminal 20 via the communicator 32 the information indicating that the distance between the position of the mobile terminal 20 at the time of the request for starting and the vehicle position at the time of parking start is longer than the restriction distance, and the inquiry information for confirmation on whether to continue the processing for starting.

Then, the controller 31 monitors whether the response to the inquiry has been received from the mobile terminal 20 (step S1407). When judging that the response has not been received from the mobile terminal 20 (No at the step S1407), the controller 31 repeats the step for the monitoring until receiving the response. When judging that the response has been received from the mobile terminal 20 (Yes at the step S1407), the controller 31 judges whether the contents of the response indicate permission to continue the processing for starting (step S1408).

When the controller 31 judges that the contents of the response from the mobile terminal 20 indicate permission to continue the processing for starting (Yes at the step S1408), the procedure moves to the next step of the processing for starting (F in FIG. 14). When judging that the contents of the response from the mobile terminal 20 indicate non-permission to continue the processing for starting (No at the step S1408), the controller 31 cancels the processing for starting and transmits the data indicating the cancellation to the mobile terminal 20 (step S1409), and the procedure of the processing for remote starting is finished (G in FIG. 14).

When the starting restricting part 31b judges that the calculated distance is longer than the restriction distance, the procedure of the processing for starting may be cancelled without the controller 31 confirming on whether to continue the processing for starting. In this case also, the controller 31 executes the processing for transmitting to the mobile terminal 20 the information indicating that the processing for starting has been cancelled. That is, when No is obtained at the step S1405, the procedure moves to the step S1409.

Next, the position judging part 31c judges whether the vehicle is in the no-idling zone (step S1501). As above, the no-idling zones are included in the map information 33e stored in the memory 33. The position judging part 31c reads out the vehicle position information 33b from the memory 33 (that is, the parking start position) and the no-idling zones included in the map information 33e. Then, the position judging part 31c judges whether the parking start position of the vehicle is inside the no-idling zone by comparing the vehicle position information 33b and the no-idling zones. When the position judging part 31c judges that the parking start position of the vehicle is in the no-idling zone (Yes at the step S1501), since no vehicle is allowed to be kept in the idling condition by the remote starting, the controller 31 cancels the processing for starting without confirming with the mobile terminal 20 on whether to start the driving apparatus, and transmits the information indicating the cancellation to the mobile terminal 20 (step S1502), and the procedure of the processing for remote starting is finished (G in FIG. 15).

When judging that the parking start position of the vehicle is not in the no-idling zone (No at the step S1501), the position judging part 31c judges whether the parking start position of the vehicle is in the specific area (step S1503). Concretely, the position judging part 31c reads out the vehicle position information 33b (that is, the parking start position) from the memory 33 and the specific areas included in the map information 33e. Then, the position judging part 31c judges whether the parking start position of the vehicle is in the specific area by comparing the vehicle position information 33b and the specific areas.

When the position judging part 31c judges that the parking start position of the vehicle is not in the specific area (No at the step S1503), the procedure of the controller 31 moves to the next step of the processing for starting (H in FIG. 15). When the position judging part 31c judges that the parking start position of the vehicle is in the specific area (Yes at the step S1503), the procedure of the controller 31 moves to the step of the processing for confirming whether to continue the processing for starting (step S1504). Concretely, the controller 31 transmits to the mobile terminal 20 via the communicator 32 the information indicating that the parking start position of the vehicle is in the specific area, and the inquiry information for confirmation on whether to continue the processing for starting.

Then, the controller 31 monitors whether the response to the inquiry has been received from the mobile terminal 20 (step S1505). When judging that the response has not been received from the mobile terminal 20 (No at the step S1505), the controller 31 repeats the step for the monitoring until receiving the response. When judging that the response has been received from the mobile terminal 20 (Yes at the step S1505), the controller 31 judges whether the contents of the response indicate permission to continue the processing for starting (step S1506).

When the controller 31 judges that the contents of the response from the mobile terminal 20 indicate permission to continue the processing for starting (Yes at the step S1506), the procedure moves to the next step of the processing for starting (H in FIG. 15). When judging that the contents of the response from the mobile terminal 20 indicate non-permission to continue the processing for starting (No at the step S1506), the controller 31 cancels the processing for starting and transmits the data indicating the cancellation to the mobile terminal 20 (step S1507), and the procedure of the processing for remote starting is finished (G in FIG. 15).

When it is judged that the parking start position of the vehicle is in the specific area, the controller 31 may cancel the processing for starting without confirming on whether to continue the processing for starting. In this case also, the controller 31 executes the processing for transmitting to the mobile terminal 20 the information indicating that the processing for starting has been cancelled. That is, when Yes is obtained at the step S1503, the procedure moves to the step S1507.

Next, the controller 31 transmits the command of the request for communication connection to the remote starter 10 via the communicator 32, and establishes the communication with the remote starter 10 (step S1601). After the communication is established, the controller 31 receives the vehicle position information and the vehicle information from the remote starter 10 via the communicator 32 (step S1602). The received vehicle position information is the vehicle position information that has been transmitted at the step S803 in FIG. 8, and indicates the parking position at the time of the request for remote starting. That is, the remote starter 10 is on standby while the ignition is in the off-state, and only the communicator 13 is activated. After the communication with the center 30 is established, the remote starter 10 obtains the vehicle position information by activating the controller 11 and the position information obtaining part 12, and then transmits the obtained vehicle position information to the center 30.

When judging that the vehicle position information has not been obtained at the step S1401, the controller 31 executes the processing for obtaining the vehicle position information by establishing the communication with the remote starter 10. That is, when No is obtained at the step S1401, the step S1402 and the step S1403 are executed. Therefore, at the step S1601, the communication with the remote starter 10 has been established, and the vehicle position information has been obtained as well. Therefore, when Yes is obtained at the step S1401, the controller 31 needs to execute the processing of the step S1601 and the step S1602. When No is obtained at the step S1401, the controller 31 need not execute the processing of the step S1601. Furthermore, the controller 31 may not, or may, execute the processing of the step S1602.

Next, the starting restricting part 31b judges whether the position-restriction function is activated (step S1603). In the setting information 33d stored in the memory 33 of the center 30, the position-restriction function is activated as initial settings. However, when the position-restriction function is activated or deactivated on the mobile terminal 20, and when such information is transmitted as the setting information to the center 30, the setting information 33d is rewritten to the newly transmitted setting information. The starting restricting part 31b can judge whether the position-restriction function is activated or deactivated in reference to the stored setting information 33d.

When it is judged that the position-restriction function is not activated (No at the step S1603), the starting directing part 31d transmits the command of the request for starting to the remote starter 10 (step S1609), and the procedure of the processing for remote starting is finished. When judging that the position-restriction function is activated (Yes at the step S1603), the starting restricting part 31b judges whether the vehicle position at the time of parking start (parking start position) is identical to the vehicle position at the time of the request for remote starting that has been received at the step S1602 (step S1604). Concretely, the starting restricting part 31b judges the difference between the vehicle position information 33b at the time when the ignition is switched off (that is, the parking start position), which is stored in the memory 33, and the vehicle position information 33b received at the step S1602 (that is, the parking position at the time of the request for remote starting), by comparing them with each other.

When the vehicle position information at the time of parking start is identical to the vehicle position information at the time of the request for starting, the starting restricting part 31b judges that the positions are identical. When the vehicle position information at the time of parking start is different from the vehicle position information at the time of the request for starting, or when either of them corresponds to the undetermined-information, the starting restricting part 31b judges that the positions are different. Furthermore, when both of the vehicle position information at the time of parking start and the vehicle position information at the time of the request for starting correspond to the undetermined-information, the starting restricting part 31b judges that the positions are identical.

Then, the starting restricting part 31b reads out the restriction conditions included in the setting information 33d stored in the memory 33, and compares the read-out restriction conditions and the difference between the positions. As the restriction conditions in the embodiment, when the positions are identical, the remote start is permitted; when the positions are different, confirmation on whether to continue the processing for starting is required.

As a result of the comparison, when it is judged that the positions are identical (Yes at the step S1604), the starting directing part 31d transmits the command of the request for starting to the remote starter 10 (step S1609), and the procedure of the processing for remote starting is finished. The judgment that the positions are identical indicates that the vehicle position at the time of parking start is identical to the current vehicle position. The judgment is made on the basis that the vehicle stays without moving against user's will.

When it is judged that the two positions are different (No at the step S1604), the procedure of the controller 31 moves to the step for executing the processing for confirming whether to continue the processing for starting (step S1605). Concretely, the controller 31 transmits to the mobile terminal 20 via the communicator 32 the information indicating that the vehicle position at the time of parking start is different from the vehicle position at the time of the request for starting, and the inquiry information for confirming whether to continue the processing for starting. The judgment that the two positions are different indicates that the vehicle position at the time of parking start is different from the current vehicle position. It is assumed that the vehicle has been moved against user's will such as by theft or tow-away.

Then, the controller 31 monitors whether the response to the inquiry has been received from the mobile terminal 20 (step S1606). When judging that the response has not been received from the mobile terminal 20 (No at the step S1606), the controller 31 repeats the step for the monitoring until receiving the response. When judging that the response has been received from the mobile terminal 20 (Yes at the step S1606), the controller 31 judges whether the contents of the response indicate permission to continue the processing for starting (step S1607).

When the controller 31 judges that the contents of the response from the mobile terminal 20 indicate permission to continue the processing for starting (Yes at the step S1607), the starting directing part 31d transmits the command of the request for starting to the remote starter 10 (step S1609), and the procedure of the processing for remote starting is finished. When judging that the contents of the response from the mobile terminal 20 indicate non-permission to continue the processing for starting (No at the step S1607), the controller 31 cancels the processing for starting, transmits the information of the cancellation to the mobile terminal 20 (step S1608), and the procedure of the processing for remote starting is finished (G in FIG. 16).

When it is judged that the two positions are different, the procedure of the processing for starting may be cancelled without the controller 31 executing the processing for confirming on whether to continue the processing for starting. In this case also, the controller 31 executes the processing for transmitting to the mobile terminal 20 the information indicating that the processing for starting has been cancelled. That is, when No is obtained at the step S1604, the procedure moves to the step S1608.

When all of the necessary data have been transmitted and received between the center 30 and the remote starter 10, the center 30 automatically terminates the communication with the remote starter 10. In an example, when the request for connection is transmitted by the remote starter 10 (step S1201), the controller 31 automatically terminates the communication with the remote starter 10 after data are received from the remote starter 10. When the center 30 establishes the communication with the remote starter 10, the controller 31 automatically terminates the communication when judging that the remote starter 10 has completed transmitting a series of the responses to the received command, such as the command of the request for starting (step S1609). The judgment that the remote starter 10 has completed transmitting the series of the responses is made when information of starting completion or time information at the time of starting has been received.

In the distance-restriction function (step S1404 to step S1409) and the restriction function in the no-idling zone and the specific area (step S1501 to S1507) based on the processing for remote starting described above, the center 30 judges on whether to remotely start the driving apparatus by use of the vehicle position information received at the time when the ignition is switched off. Only when the remote starting is available, the center 30 transmits the command of the request for starting by establishing the communication with the remote starter 10. Therefore, it is no need for the center 30 to establish communications with the remote starter 10 every time the request for remote starting is received from the mobile terminal 20, which reduces communication costs.

The position-restriction function (step S1603 to step S1608) restricts the starting when the vehicle position at the time of parking start is different from the vehicle position at the time of the request for starting, that is, when the starting is not suitable, which prevents useless starting.

When the vehicle is parked in the no-idling zone or the specific area under the condition that the restriction mode of the remote starter 10 is activated, transmitting the vehicle position information at the time of parking start is forbidden, which reduces the communication costs further.

In the embodiment described above, the restriction mode (step S607 in FIG. 6) for restricting transmission of the vehicle position information at the time of parking start is provided on the remote starter 10, and transmitting the vehicle position information is restricted based on whether the vehicle under the restriction mode being activated is parked in the restricted area. However, the restriction mode may not be necessary. In this case, when the vehicle is parked in the restricted area, transmitting the vehicle position information from the remote starter 10 to the center 30 is completely forbidden.

Further, in the embodiment described above, the center 30 executes, as the processing for remote starting, the processing for starting based on the distance-restriction function, the processing for starting based on the judgment in terms of the no-idling zone and the specific area, and the processing for starting based on the position-restriction function. However, it is not necessary to execute all of the processing. One or more of the processing including the position-restriction function may be executed individually or in appropriate combination.

When the information indicating that the parking start position of the vehicle does not correspond to the actual parking start position is added, the center 30 may restrict the restriction function. Here is an example at the step S1503 for judging whether the parking start position is in the specific area. Relatively-narrow areas such as a rest area and a parking area on an expressway, a parking area of a convenience store correspond to the specific areas. Therefore, when the vehicle position information 33b stored as the parking start position is different from the actual parking start position, the actual parking start position may not be in the specific area. Therefore, when the information indicating that the parking start position of the vehicle does not correspond to the actual parking start position is added, the steps from the step S1503 to the step S1507 for a specific-area restriction function may be disabled. Other restriction functions may be disabled as well.

Further, in the embodiment described above, the information of the ignition switched off is used as the parking start information. When the ignition condition is switched to the off-state, it is judged that parking has started. Thus, the vehicle position information is transmitted to the center. However, making the judgment whether the parking has started is not limited to this case. Other kinds of the vehicle information are acceptable as long as the judgment whether parking has started can be made based on them. In an example of using an engine as the driving apparatus, the judgment that parking has started may be made based on the engine revolution indicating that the engine has stopped. In another example on the vehicle equipped with a keyless entry apparatus, the judgment that parking has started may be made based on the information indicating that a door has been locked by the keyless entry apparatus. The point is just transmitting the vehicle position information after judging that parking has started.

<2. Second Embodiment>

Next, the second embodiment is described. In the configuration of the first embodiment, when the vehicle position information is not available at parking start, the latest vehicle position information that has been obtained is transmitted to the center 30 as the parking start position. However, when the vehicle keeps running while the vehicle position information is not available, the actual parking start position may be far away from the parking start position transmitted to the center 30.

Therefore, in the configuration of the second embodiment, judgment whether to transmit the latest vehicle position information that has been obtained is made based on the elapsed time for or the distance which the vehicle has run since the vehicle position information had become unavailable. The description hereafter is focused on the differences from the first embodiment.

<2-1. Outline of System>

A remote starter system 100 of the second embodiment has the same configuration as the remote starter system shown in FIG. 1. Moreover, each of a mobile terminal 20 and a center 30 of the second embodiment also has the same configuration and executes the same processing, as the one of the first embodiment. However, a remote starter of the second embodiment has a partially-different configuration and executes partially-different processing, from the ones of the first embodiment. Therefore, description hereafter of the configuration and the processing of the remote starter is focused on the differences from the ones of the first embodiment.

<2-2. Configuration of Remote Starter>

Figure 17:
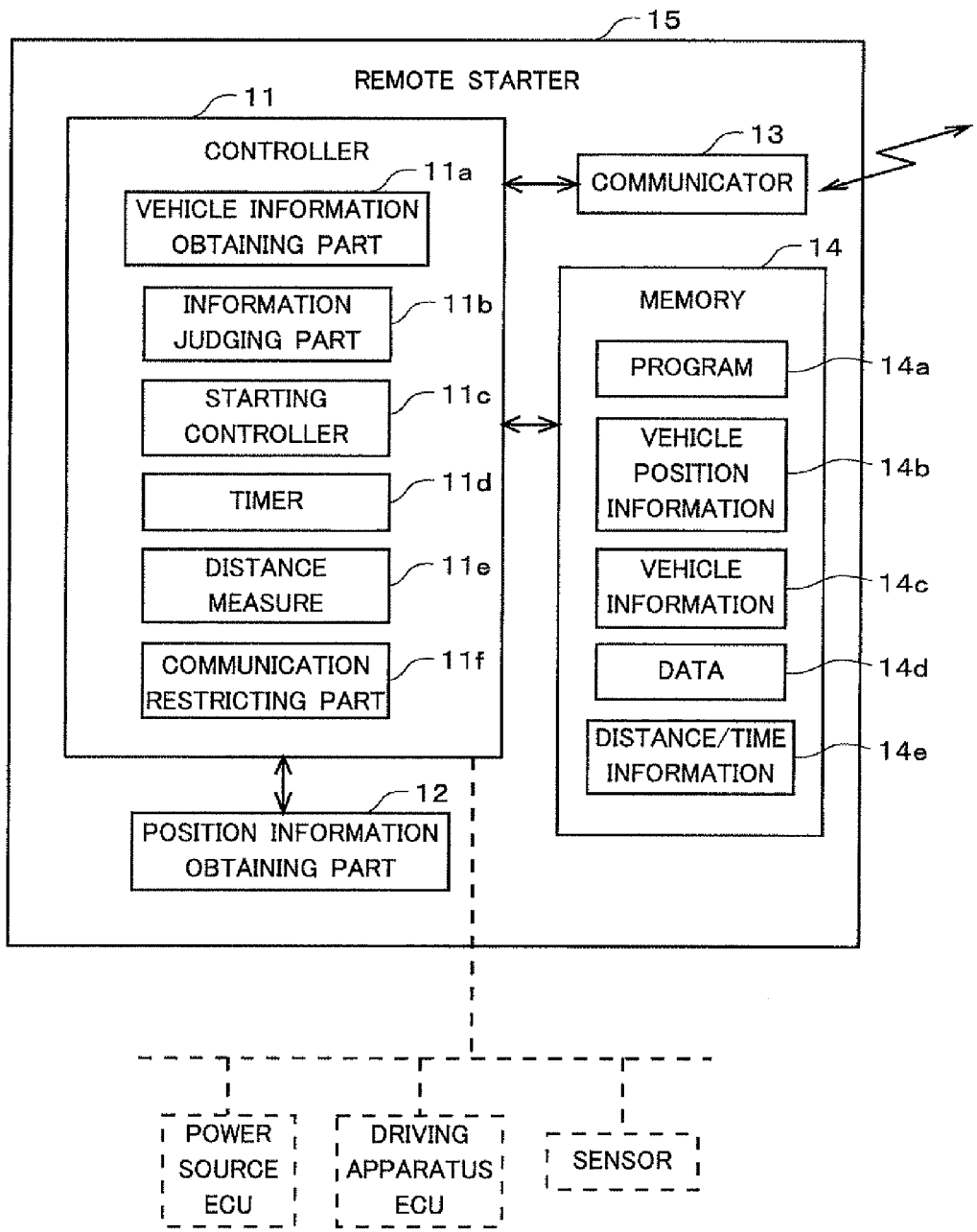
FIG. 17 shows a schematic block diagram of the remote starter of the second embodiment.

Described first is the configuration of a remote starter 15 of the second embodiment. FIG. 17 shows a schematic block diagram of the remote starter 15. As shown in FIG. 17, the remote starter 15 includes a controller 11, a position information obtaining part 12, a communicator 13 and memory 14.

The controller 11 includes a vehicle information obtaining part 11a, an information judging part 11b, a starting controller 11c, a timer 11d, a distance measure 11e and a communication restricting part 11f. Each element other than the timer 11d, the distance measure 11e and the communication restricting part 11f is the same as the one of the first embodiment. Therefore, the timer 11d, the distance measure 11e and the communication restricting part 11f are only described below. Descriptions of the other elements are omitted.

The timer 11d counts elapsed time. In an example, when a period of time for driving the driving apparatus executed by the remote starter is determined in advance, the timer 11d counts the elapsed time from the starting, and judges whether the predetermined period of time has elapsed. The timer 11d is also capable of measuring clock time, for example, measuring the clock time at the time of the starting. Further, the timer 11d also executes the processing for measuring the running time of the vehicle. The running time measured by the timer 11d is stored as information 14e concerning the running time in the memory 14.

The distance measure 11e measures the running distance of the vehicle. The distance measure 11e measures the distance that the vehicle runs based on vehicle information obtained by the vehicle information obtaining part 11a, such as the outputs from a vehicle velocity sensor and a steering angle sensor. The running distance measured by the distance measure 11e is stored as the information 14e concerning the running distance in the memory 14.

The communication restricting part 11f restricts transmission of information to the center 30. Concretely, the communication restricting part 11f judges whether to transmit information to the center 30 based on various conditions. When making a judgment not to transmit information, the communication restricting part 11f restricts the transmission. In an example, the communication restricting part 11f judges whether to transmit the vehicle position information based on the running distance and the running time of the vehicle.

Each of the position information obtaining part 12 and the communicator 13 has the same configuration as the one of the first embodiment.

The memory 14 stores a program 14a, vehicle position information 14b, vehicle information 14c, data 14d and the information 14e concerning the distance and the time. The same type of the memory of the first embodiment can be used as the memory 14 of the second embodiment. Moreover, each of the program 14a and the vehicle position information 14b of the second embodiment is the same type as the one of the first embodiment.

The information 14e concerning the distance and the time includes the information of the running distance and the running time described above, and information of a prescribed distance and a prescribed time used when the communication restricting part 11f restricts communications.

<2-3. Processing on Remote Starter>

Figure 18:
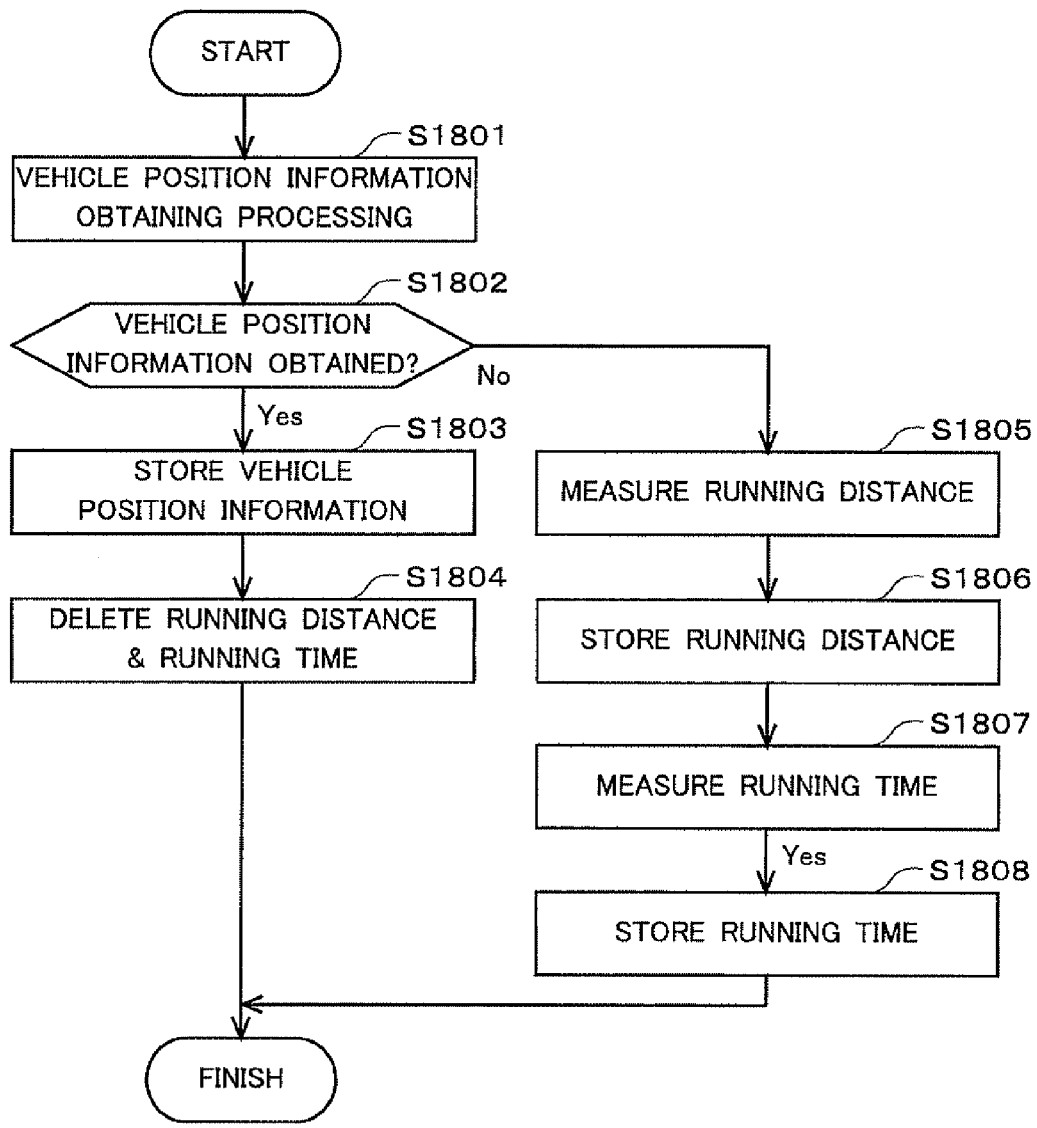
FIG. 18 shows a flowchart of processing on the remote starter of the second embodiment.
Figure 19:
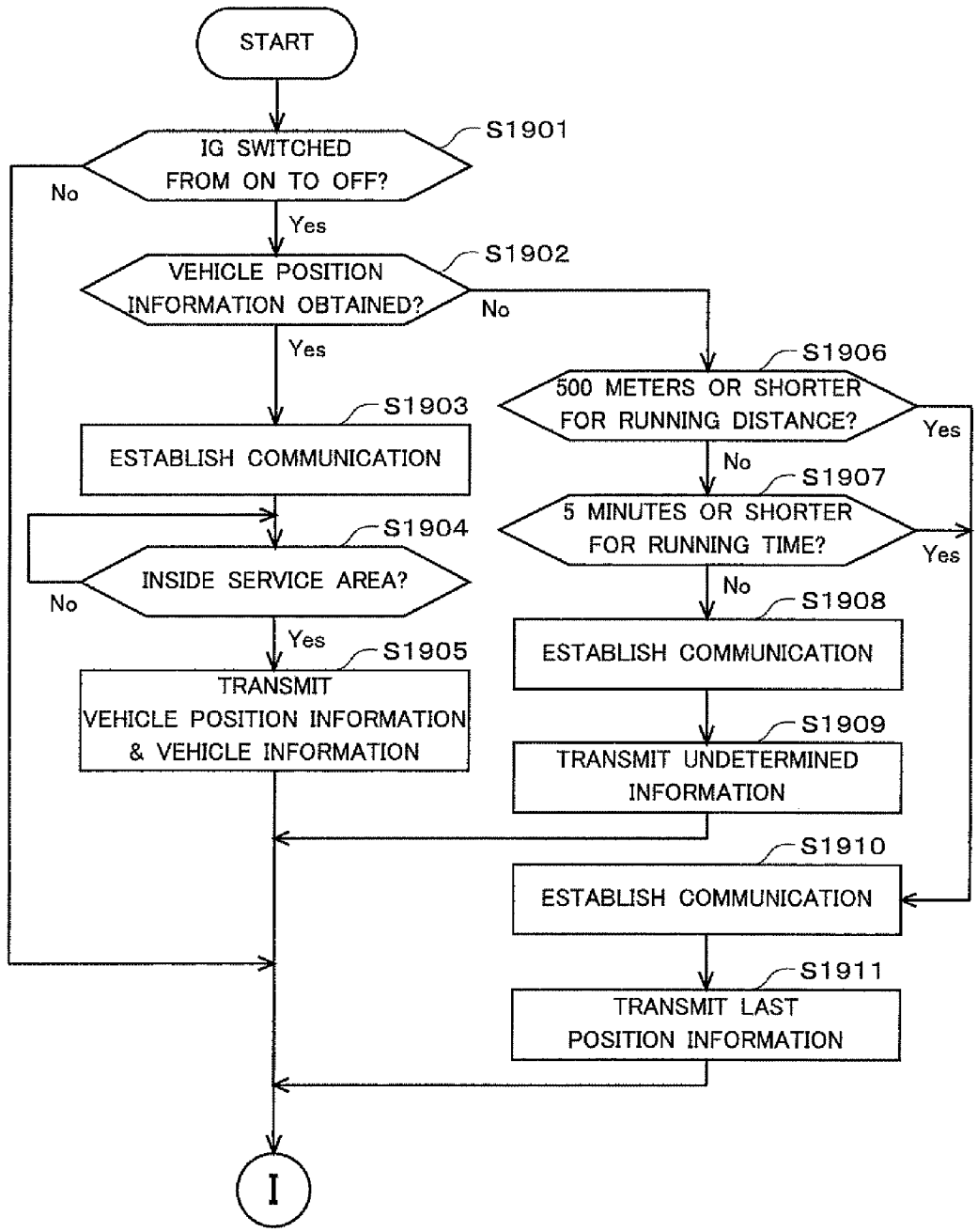
FIG. 19 shows another flowchart of processing on the remote starter of the second embodiment.
Figure 20:
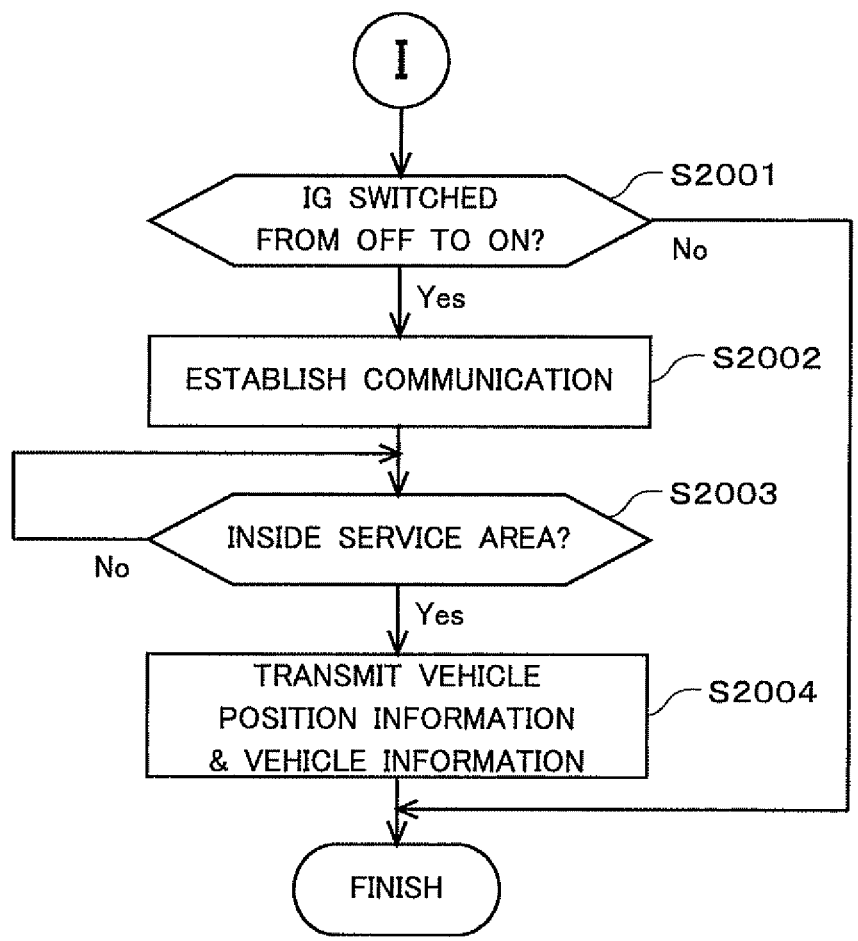
FIG. 20 shows another flowchart of processing on the remote starter of the second embodiment.

Described next is the processing on the remote starter 15. Each of FIG. 18, FIG. 19 and FIG. 20 shows a flowchart of the processing on the remote starter 15. The remote starter 15 of the second embodiment also obtains the vehicle position information periodically while the ignition of the vehicle is in the on-state. Here, described is the processing on the remote starter 15 for obtaining the vehicle position information. FIG. 18 shows the flowchart of the processing on the remote starter 15 for obtaining the vehicle position information.

The position information obtaining part 12 executes the processing for obtaining the vehicle position information (step S1801). Then, after executing the processing for obtaining the vehicle position information, the position information obtaining part 12 judges whether the vehicle position information actually has been obtained (step S1802). These steps for the processing are the same as the step S501 and the step S502 described above.

Next, when judging that the vehicle position information has been obtained (Yes at the step S1802), the position information obtaining part 12 stores the obtained vehicle position information in the memory 14 (step S1803). Next, when the memory 14 stores the information 14e concerning the running distance and the running time, the position information obtaining part 12 deletes the information (step S1804). When the vehicle position information is not available, the information 14e concerning the running distance and the running time is to be stored, as described later. However, when the vehicle position information becomes available afterward, the information 14e concerning the running distance and the running time is not necessary any more. Therefore, the stored information 14e concerning the running distance and the running time is deleted in this procedure. Then, the procedure of the processing for obtaining the vehicle position information is finished. The procedure of the processing restarts from the step S1801 at the next time for obtaining the vehicle position information.

When the position information obtaining part 12 judges that the vehicle position information is not available (No at the step S1802), the distance measure 11e executes the processing for measuring the running distance of the vehicle (step S1805). Concretely, the vehicle information obtaining part 11a obtains the vehicle information such as the outputs from the vehicle velocity sensor and the steering angle sensor. The distance measure 11e measures the running distance of the vehicle based on the various vehicle information.

Especially in the second embodiment, the distance measure 11e measures the running distance of the vehicle from the time when the position information obtaining part 12 has judged that the vehicle position information is not available to the time when the vehicle information obtaining part 11a has judged that parking of the vehicle has started. That is, the distance measure 11e measures the running distance just after the position information becomes unavailable while running, to the time of the parking start. Then, the distance measure 11e stores the information 14e concerning the measured running distance in the memory 14 (step S1806).

Next, the timer 11d measures the running time of the vehicle (step S1807). In the second embodiment, the timer 11d measures the running time of the vehicle from the time when the position information obtaining part 12 has judged that the vehicle position information is not available to the time when the vehicle information obtaining part 11a has judged that parking of the vehicle has started. That is, the timer 11d measures the running time just after the position information becomes unavailable while running, to the time of the parking start. Then, the timer 11d stores the information concerning the measured running time in the memory 14 (step S1808), and the procedure is finished.

The remote starter 15 repeats the same processing on a regular basis for obtaining the vehicle position information afterward. Therefore, if the state where the vehicle position information is unavailable continues while running, the vehicle position information just before the vehicle position information becomes unavailable (last position information) remains as the vehicle position information in the memory 14. The steps for measuring the running distance (the step S1805 and the step S1806) and the steps for measuring the running time (the step S1807 and the step S1808) may be executed in the reverse order, or executed concurrently.

In the second embodiment as well, when the ignition condition is manually switched on or off, the remote starter 15 executes the processing for transmitting the vehicle position information and the vehicle information to the center 30 in accordance with the switching. Described next is the processing on the remote starter 15 for transmitting the vehicle position information and the vehicle information. Each of FIG. 19 and FIG. 20 shows the flowchart of the processing on the remote starter 15 for transmitting the vehicle position information and the vehicle information to the center 30.

First, the vehicle information obtaining part 11a detects whether the ignition has been manually switched from the on-state to the off-state (step S1901). The step of the processing is the same as the one of the step S601 described above. When the vehicle information obtaining part 11a does not detect that the ignition has been switched from the on-state to the off-state (No at the step S1901), the procedure moves to the next step (I in FIG. 19).

When the vehicle information obtaining part 11a detects that the ignition has been switched from the on-state to the off-state (Yes at the step S1901), that is, when the parking start of the vehicle is detected, the position information obtaining part 12 judges whether the vehicle position information at the time of the parking start has been obtained. The position information obtaining part 12 can execute the judgment in the same manner as the step S602 described above.

When the position information obtaining part 12 judges that the vehicle position information at the time of the parking start has been obtained (Yes at the step S1902), the controller 11 establishes the communication with the center 30 (step S1903). Then, the communicator 13 judges whether the vehicle is in the service area where the communication with the center 30 are available (step S1904). When judging that the vehicle is in the service area for communications (Yes at the step S1904), the communicator 13 transmits the vehicle position information and the vehicle information at the time of the parking start to the center 30 (step S1905), and the procedure moves to the next step (I in FIG. 19). When judging that the vehicle is not in the service area for communications (No at the step S1904), the communicator 13 judges once again whether the vehicle is in the service area for communications. The procedure from the step S1903 to the step S1905 are the same procedure from the step S701 to the step S703 described above.

When the position information obtaining part 12 judges that the vehicle position information at the time of parking start has not been obtained (No at the step S1902), the communication restricting part 11f executes the processing for judging whether to transmit the last position information.

Concretely, the communication restricting part 11f judges whether the running distance is equal to or shorter than the prescribed distance (step S1906). That is, the communication restricting part 11f reads out the information 14e concerning the running distance and the information 14e concerning the prescribed distance stored in the memory 14, and compares the two of the information 14e. In doing so, the communication restricting part 11f judges whether the running distance is equal to or shorter than the prescribed distance. The prescribed distance is set in the distance range where the last position information is acceptable as the information of the parking start position. In the second embodiment, the distance of 500 meters is set as the prescribed distance. However, the prescribed distance is not limited to this. An appropriate distance is permitted to be set.

When judging that the running distance is longer than the prescribed distance (500 meters, No at the step S1906), the communication restricting part 11f judges that transmitting the last position information is not permitted since the condition for the running distance is not satisfied.

Next, the communication restricting part 11f judges whether the running time is equal to or shorter than the prescribed time (step S1907). That is, the communication restricting part 11f reads out the information 14e concerning the running time and the information 14e concerning the prescribed time stored in the memory 14, and compares the two of the information 14e. In doing so, the communication restricting part 11f judges whether the running time is equal to or shorter than the prescribed time. The prescribed time is set in the time range where the last position information is acceptable as the information of the parking start position. The period of 5 minutes is set as the prescribed time in the second embodiment. However, the prescribed time is not limited to this. An appropriate time is permitted to be set.

When judging that the running time is longer than the prescribed time (5 minutes, No at the step S1907), the communication restricting part 11f judges that transmitting the last position information is not permitted since the condition for the running time is not satisfied.

Next, the controller 11 establishes the communication with the center 30 (step S1908). Then, the controller 11 transmits to the center 30 via the communicator 13 the undetermined-information obtained by the position information obtaining part 12 (step S1909), and the procedure moves to the next step (I in FIG. 19). As above, when the running distance and the running time are long, the last position information is not available as the information of the parking start position. Thus, the undetermined-information indicating that the vehicle position information at the time of parking start is not available is to be transmitted. The communication with the center 30 can be established in the same manner as the one described above. After the communication is established, the step for judging whether the vehicle is in the service area for communications may be executed in the same manner as the step S1904.

When judging that the running distance is equal to or shorter than the prescribed distance (500 meters, Yes at the step S1906), the communication restricting part 11f judges that transmitting the last position information is permitted since the condition for the running distance is satisfied. Then, the controller 11 establishes the communication with the center 30 (step S1910). Then, the controller 11 transmits the last position information read-out from the memory 14, to the center 30 as the vehicle position information at the time of parking start (step S1911), and the procedure moves to the next step (I in FIG. 19). The controller 11 transmits the information indicating that the vehicle position information does not correspond to the actual parking start position, besides the last position information to the center 30. Or, other vehicle information may be added for transmission.

When judging that the running time is equal to or shorter than the prescribed time (5 minutes, Yes at the step S1907), the communication restricting part 11f judges that transmitting the last position information is permitted since the condition for the running time is satisfied. Then, the controller 11 establishes the communication with the center 30 (step S1910). Then, the controller 11 transmits the last position information read-out from the memory 14, to the center 30 as the vehicle position information at the time of parking start (step S1911), and the procedure moves to the next step (I in FIG. 19). In this step also, the controller 11 transmits the information indicating that the transmitted vehicle position information does not correspond to the current parking start position, besides the last position information. Or, other vehicle information may be added for transmission.

That is, the remote starter 15 transmits to the center 30 the last position information as the information of the parking start position in either case when the running distance is shorter than the prescribed distance or when the running time is shorter than the prescribed time.

Through the processing described above, the center 30 is, as well as the first embodiment, capable of obtaining the exact parking start position when having obtained the vehicle position information at the time of parking start, and capable of obtaining the rough parking start position when having not obtained the vehicle position information at the time of parking start. In the second embodiment, only when the rough parking start position is located in a prescribed range from the actual parking start position, the vehicle position information is transmitted. Therefore, besides the effect obtained in the first embodiment, the center 30 is capable of obtaining closer position information even when having not obtained the vehicle position information at the time of parking start.

The steps for establishing the communication with the center 30 at the step S1908 and the step S1910 are executed in the same manner as the one described above. After the communication is established, the step for judging whether the vehicle is in the service area for communications may be executed in the same manner as the step S1904. The step for making a judgment for transmission based on the running distance (step S1906) and the step for making a judgment for transmission based on the running time (step S1907) may be executed in the reverse order, or executed concurrently.

Next, the vehicle information obtaining part 11a detects whether the user manually has switched the ignition from the off-state to the on-state (step S2001). When the vehicle information obtaining part 11a does not detect that the ignition has been switched from the off-state to the on-state (No at the step S2001), the procedure is finished without any execution of the processing. In the case of detecting that the ignition has been switched from the off-state to the on-state (Yes at the step S2001), the vehicle information obtaining part 11a judges that the vehicle is not to be parked any more. Then, the controller 11 establishes the communication with the center 30 (step S2002).

After the communication is established, the communicator 13 periodically judges whether the vehicle is in the service area where the communications with the center 30 are available (step S2003). When judging that the vehicle is not in the service area for communications (No at the step S2003), the communicator 13 judges once again whether the vehicle is in the service area for communications. When judging that the vehicle is in the service area for communications (Yes at the step S2003), the communicator 13 transmits to the center 30 the vehicle position information and the vehicle information (step S2004), and the procedure is finished. The procedure from the step S2001 to the step S2004 are the same procedure from the step S704 to the step S707 described above.

Further, in the first embodiment and the second embodiment described above, various functions are executed by software, specifically by CPU processing based on programs. However, some of these functions may be executed by electrical hardware circuits. Contrarily, some of the functions executed through hardware circuits in the above descriptions may be executed through software. The various kinds of the processing described in the first embodiment and the second embodiment may be arbitrarily combined.

In the invention, a distance measure measures the running distance from the position where the position information of the vehicle becomes unavailable to the parking start position. When the running distance is equal to or shorter than a prescribed distance, a judging part judges that the last position information is to be transmitted. Thus, only when the last position information is available as the actual parking start position, the last position information is transmitted, which prevents transmission when the position where the vehicle position information becomes unavailable is deemed too far from the actual parking start position.

In the invention, a timer measures the running time from when the position information of the vehicle becomes unavailable to the time of parking start. When the running time is equal to or shorter than a prescribed time, the judging part judges that the last position information is to be transmitted. Thus, only when the last position information is available as the actual parking start position, the last position information is transmitted, which prevents transmission when the position where the vehicle position information has become unavailable is deemed too far from the actual parking start position.

In the invention, when the position where the vehicle position information has become unavailable is deemed too far from the actual parking start position, an information processor is capable of obtaining such information.

Further in the invention, the fact that parking has started is detected.

Further in the invention, the information processor is capable of obtaining a rough parking start position. Therefore, even when the remote starter can not obtain the vehicle position information, the processing of the request for starting can be executed.

While the invention has been shown and described in detail, the foregoing description is in all aspects illustrative and not restrictive. It is therefore understood that numerous other modifications and variations can be devised without departing from the scope of the invention.

What is claimed is:

1. A remote starter that is installed in a vehicle for executing starting control of a driving apparatus of the vehicle, and that executes the starting control of the driving apparatus in response to a request for starting transmitted by an information processor that is located outside the vehicle, the request for starting being transmitted based on vehicle position information of the vehicle at a time of start of parking prior to the request for starting, the remote starter comprising:
   a communicator, controlled by the information processor, that communicates with the information processor by transmitting and receiving information;
   a position-information-obtaining-part, controlled by the information processor, that obtains the vehicle position information of the vehicle; and
   a controller, controlled by the information processor, that obtains information relating to the start of parking of the vehicle,
   wherein when the position-information-obtaining-part has obtained the vehicle position information at the time that the controller obtains the information relating to the start of parking, the communicator transmits the vehicle position information at the time of the start of parking to the information processor,
   wherein when the position-information-obtaining-part has not obtained the vehicle position information at the time that the controller obtains the information relating to the start of parking, the communicator transmits last position information that is the vehicle position information obtained by the position-information-obtaining-part just before the vehicle position information becomes unavailable, to the information processor as the vehicle position information at the time of the start of parking,
   wherein the controller:
   measures a running distance of the vehicle; and
   judges whether to transmit the vehicle position information based on the running distance,
   wherein the controller measures the running distance from a time when the position-information-obtaining-part has judged that the vehicle position information is not available to a time when the controller obtains the information relating to the start of parking of the vehicle, and
   wherein when the position-information-obtaining-part cannot obtain the vehicle position information at the time that the controller obtains the information relating to the start of parking, the controller determines to transmit the last position information as the vehicle position information at the time of the start of parking, as long as the running distance is equal to or shorter than a prescribed distance.

2. The remote starter of claim 1, wherein
   the communicator transmits the last position information also when the position-information-obtaining-part judges that the vehicle position information is not available.

3. A remote starter that is installed in a vehicle for executing starting control of a driving apparatus of the vehicle, and that executes the starting control of the driving apparatus in response to a request for starting transmitted by an information processor that is located outside the vehicle, the request for starting being transmitted based on vehicle position information of the vehicle at a time of start of parking prior to the request for starting, the remote starter comprising:
- a communicator, controlled by the information processor, that communicates with the information processor by transmitting and receiving information;
- a position-information-obtaining-part, controlled by the information processor, that obtains the vehicle position information of the vehicle; and
- a controller, controlled by the information processor, that obtains information relating to the start of parking of the vehicle,
- wherein the controller includes:
  - a timer that measures a running time of the vehicle; and
  - the controller that judges whether to transmit the vehicle position information based on the running time,
- wherein when the position-information-obtaining-part has obtained the vehicle position information at the time that the controller obtains the information relating to the start of parking, the communicator transmits the vehicle position information at the time of the start of parking to the information processor,
- wherein when the position-information-obtaining-part has not obtained the vehicle position information at the time that the controller obtains the information relating to the start of parking, the communicator transmits last position information that is the vehicle position information obtained by the position-information-obtaining-part just before the vehicle position information becomes unavailable, to the information processor as the vehicle position information at the time of the start of parking,
- wherein the timer measures the running time from a time when the position-information-obtaining-part has judged that the vehicle position information is unavailable to a time when the controller obtains the information relating to the start of parking of the vehicle, and
- wherein when the position-information-obtaining-part cannot obtain the vehicle position information at the time that the controller obtains the information relating to the start of parking, the controller determines to transmit the last position information as the vehicle position information at the time of the start of parking, as long as the running time is equal to or shorter than a prescribed time.

4. The remote starter of claim 1, wherein
when the vehicle position information is unavailable, the position-information-obtaining-part obtains undetermined-information indicating that the vehicle position information is unavailable, and
when the controller makes a judgment not to transmit the last position information, the communicator transmits the undetermined-information.

5. The remote starter of claim 1, wherein
the information relating to the start of parking is information indicating that an ignition of the vehicle is switched from an on-state to an off-state.

6. A remote starting system comprising:
an information processor;
a remote starter that is installed in a vehicle and executes starting control of a driving apparatus of the vehicle in response to a request for starting transmitted by the information processor that is located outside the vehicle, the request for starting being transmitted based on vehicle position information of the vehicle at a time of start of parking prior to the request for starting, the remote starter comprising:
- a communicator, controlled by the information processor, that communicates with the information processor by transmitting and receiving information;
- a position-information-obtaining-part, controlled by the information processor, that obtains the vehicle position information of the vehicle;
- a controller, controlled by the information processor, that obtains information relating to the start of parking of the vehicle,
wherein when the position-information-obtaining-part has obtained the vehicle position information at the time that the controller obtains the information relating to the start of parking, the communicator transmits the vehicle position information at the time of the start of parking to the information processor, and
when the position-information-obtaining-part has not obtained the vehicle position information at the time that the controller obtains the information relating to the start of parking, the communicator transmits last position information that is the vehicle position information obtained by the position-information-obtaining-part just before the vehicle position information becomes unavailable, to the information processor as the vehicle position information at the time of parking start; and
a mobile terminal that transmits the request for starting of the vehicle to the information processor,
the information processor being configured to be communicatively coupled to the mobile terminal and to the remote starter, and the information processor transmitting the request for starting of the vehicle to the remote starter based on the request for starting of the vehicle received from the mobile terminal,
wherein the controller:
measures a running distance of the vehicle; and
judges whether to transmit the vehicle position information based on the running distance,
wherein the controller measures the running distance from a time when the position-information-obtaining-part has judged that the vehicle position information is not available to a time when the controller obtains the information relating to the start of parking of the vehicle, and
wherein when the position-information-obtaining-part cannot obtain the vehicle position information at the time that the controller obtains the information relating to the start of parking, the controller determines to transmit the last position information as the vehicle position information at the time of the start of parking, as long as the running distance is equal to or shorter than a prescribed distance.

7. A remote starting system comprising:
an information processor;
a remote starter that is installed in a vehicle and executes starting control of a driving apparatus of the vehicle in response to a request for starting transmitted by the information processor that is located outside the vehicle, the request for starting being transmitted based on vehicle position information of the vehicle at a time of start of parking prior to the request for starting, the remote starter comprising:
a controller configured to operate:
- a communicator, controlled by the information processor, that communicates with the information processor by transmitting and receiving information;
- a position-information-obtaining-part, controlled by the information processor, that obtains the vehicle position information of the vehicle; and a controller, controlled by the information processor, that obtains information relating to the start of parking of the vehicle, wherein the controller includes:
  a timer that measures a running time of the vehicle; and
  the controller that judges whether to transmit the vehicle position information based on the running time,
wherein when the position-information-obtaining-part has obtained the vehicle position information at the time that the controller obtains the information relating to the start of parking, the communicator transmits the vehicle position information at the time of the start of parking to the information processor,
wherein when the position-information-obtaining-part has not obtained the vehicle position information at the time that the controller obtains the information relating to the start of parking, the communicator transmits last position information that is the vehicle position information obtained by the position-information-obtaining-part just before the vehicle position information becomes unavailable, to the information processor as the vehicle position information at the time of the start of parking; and
a mobile terminal that transmits the request for starting of the vehicle to the information processor,
the information processor being configured to be communicatively coupled to the mobile terminal and to the remote starter, and the information processor transmitting the request for starting of the vehicle to the remote starter based on the request for starting of the vehicle received from the mobile terminal,
the timer measures the running time from a time when the position-information-obtaining-part has judged that the vehicle position information is unavailable to a time when the controller obtains the information relating to the start of parking of the vehicle, and
when the position-information-obtaining-part cannot obtain the vehicle position information at the time that the controller obtains the information relating to the start of parking, the controller determines to transmit the last position information as the vehicle position information at the time of the start of parking, as long as the running time is equal to or shorter than a prescribed time.

* * * * *